United States Patent [19]

Nishimura et al.

[11] Patent Number: 5,390,057
[45] Date of Patent: Feb. 14, 1995

[54] CASSETTE LOADING APPARATUS

[75] Inventors: Akihiro Nishimura, Higashiosaka; Masahiro Yao, Moriguchi, both of Japan

[73] Assignee: Matsushita Electric Industrial Co., Ltd., Osaka, Japan

[21] Appl. No.: 634,547

[22] Filed: Dec. 27, 1990

[30] Foreign Application Priority Data

Dec. 27, 1989 [JP] Japan .................. 1-342047
Jul. 5, 1990 [JP] Japan .................. 2-177740
Oct. 5, 1990 [JP] Japan .................. 2-269130

[51] Int. Cl.⁶ .................................. G11B 15/60
[52] U.S. Cl. .......................... 360/96.5; 360/94; 360/132
[58] Field of Search ............... 360/85, 95, 132, 96.5, 360/94, 93; 242/199

[56] References Cited

U.S. PATENT DOCUMENTS 4,685,016  8/1987  Baranski ................. 360/132
4,844,377  7/1989  Shiomi et al. .......... 360/132
5,065,955 11/1991  Fujii ...................... 360/132
5,084,799  1/1992  Moo Yeol et al. ...... 360/132

FOREIGN PATENT DOCUMENTS 0129844  1/1985  European Pat. Off. .

Primary Examiner—Stuart S. Levy
Assistant Examiner—Paul J. Ditmyer
Attorney, Agent, or Firm—Wenderoth, Lind & Ponack

[57] ABSTRACT

A cassette loading apparatus of the present invention is capable of loading a plurality of tape cassettes different in size from each other, while achieving the following effects: A tape damage or a tape break when the lids of the tape cassette are opened/closed can be prevented; the opening height of a rear lid when the lids are opened can be maintained constant, and at the same time, a gap is not produced between the lids when the lids are closed, thereby preventing an increase of drop-outs due to the invasion of dust or the like into the gap; and damage of a rear lid opener or the rear lid when the lids are open/closed can be prevented.

7 Claims, 33 Drawing Sheets

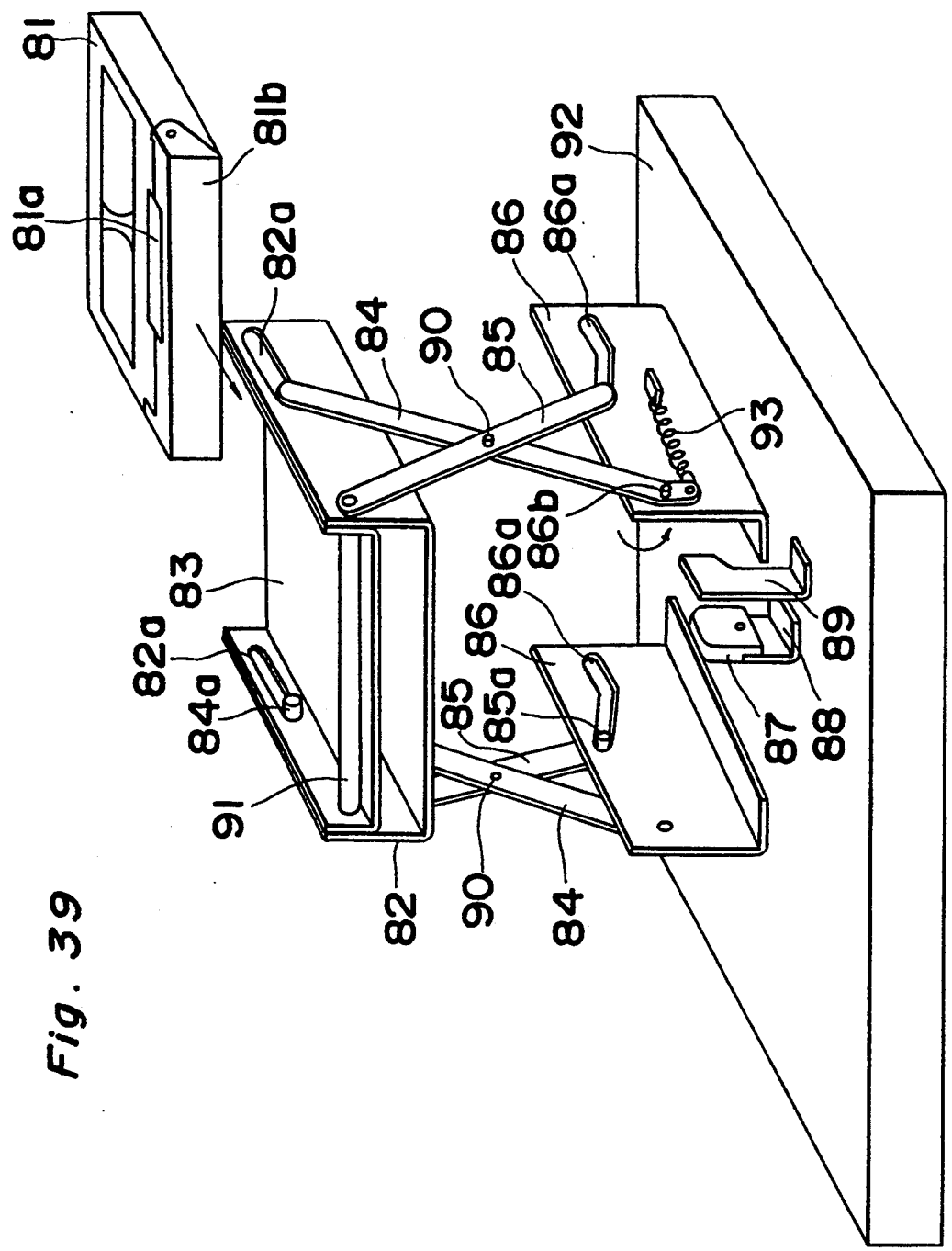

CASSETTE LOADING APPARATUS

BACKGROUND OF THE INVENTION

1. Field of the Invention

The present invention relates to a cassette loading apparatus utilizable in a magnetic recording/reproducing apparatus such as a video tape recorder and the other kinds of data processing apparatuses, etc.

2. Description of the Prior Art

Recent tape cassettes and video tape recorders of the latest model as well have become compact in size subsequent to a tendency to magnetic recording with high density. As a result, usage of the video tape recorders (hereinafter referred to as VTR) has been expanded to outdoors to pick up the scenery or the like although it was conventionally centered mainly on indoor use, e.g., for recording a television program or reproducing a software.

As such, in consideration into the outdoor use of the VTR and as a dust-proof means, a new kind of a tape cassette has been put into practical application that is equipped with two lids so as to cover the front and rear faces of the tape.

Moreover, a new model of a cassette loading apparatus fit for the VTR accommodating the above-described tape cassette of two lids has been proposed and brought into commercial market.

The above expansion of the usage of the VTR has also increased occasions to record data by means of a camcorder with a small-size tape cassette and to edit the same by an editing VTR with a large-size tape cassette.

In such case as above, it becomes necessary to load a plurality of tape cassettes of different size in the same VTR, and some cassette loading apparatuses already in use can achieve the purpose.

Hereinbelow, the conventional tape cassette loading apparatus of the type referred to above will be described with reference to the accompanying drawings.

In the first place, the structure of lids of a tape cassette loaded in the cassette loading apparatus will be explained.

Referring to FIG. 1, a tape cassette 1 is comprised of an upper half 2 and a lower half 3. The tape cassette 1 has an opening 4 at the front face thereof. A tape 5 is loaded in the opening 4 in the stretching state. The opening 4 is normally covered with a front lid 6 and a rear lid 7.

The front lid 6 is, as shown in FIG. 2, generally in U-shape and supported at a pair of fulcrum pins 9,9' at the left and right lateral faces thereof 8. The fulcrum pins 9,9' are inserted into a pair of notched parts 10 formed at the left and right ends of the upper half 2. Therefore, the front lid 6 is rotatable around the fulcrum pins 9,9'. Since there is provided a coil spring 11 at the side of the fulcrum pin 9', the front lid 6 is normally urged in a direction to close the lid.

There are a pair of bracket parts 13,13 at the lower face of an upper part 12 of the front lid 6. A pair of supporting pins 15,15 provided at the opposite lateral ends of the rear lid 7 are inserted into pin holes 14 of the respective bracket parts 13,13, so that the rear lid 7 is rotatable around the pair of the supporting pins 15.

A pair of rear lid guide grooves 17 are formed behind a pair of tape guides 16 of the lower half 3. A pair of guide pins 19 in a pair of bracket parts 18 at the lateral ends of the rear lid 7 are inserted slidably into the rear lid guide grooves 17. The front lid 6 and rear lid 7 of the tape cassette 1 are coupled to each other in the above-described fashion. Therefore, if either of the lids 6 and 7 is let opened, both the front and rear lids 6 and 7 are opened simultaneously.

Next, an example of the conventional cassette loading apparatus will be depicted with reference to the drawings.

FIGS. 3 and 4 are respectively an exploded perspective view and a perspective view of a conventional cassette loading apparatus. A cassette holder 20 of the apparatus moves the cassette 1 to a predetermined position within the VTR. Guide pins 21 are formed in the cassette holder 20 and guide angles 22 fixed to the cassette holder 20. Side plates 23 are secured to a chassis 24 in the VTR. Moreover, each side plate 23 has guide grooves 23a which are meshed with the guide pins 21. A top plate 25 is rigidly secured to the side plates 23. A rear lid opener 26 is fixed to the chassis 24 through a mounting plate 27.

The cassette loading apparatus in the above-described structure operates as follows.

When the tape cassette 1 is inserted into the cassette holder 20, the cassette holder 20 moves along the guide grooves 23a formed in the side plates 23 (the driving unit thereof is not shown). The cassette 1 is thus loaded at a predetermined position within the VTR.

During this movement of the cassette holder 20 in a vertical direction, as shown in FIGS. 5 and 6, a lower end face 7a of the rear lid 7 is brought to butt against the rear lid opener 26 of the loading apparatus. As the tape cassette 1 is further moved downwards, the lower end face 7a of the rear lid 7 is thrusted to the rear lid opener 26 and guided along the guide grooves 17, so that the rear lid 7 is opened. At the same time, the front lid 6 which has the rear lid 7 mounted in a rotatable manner is turned in an opening direction against the coil spring 11.

The lids of the conventional tape cassette loading apparatus are opened in the manner as described hereinabove. On the other hand, they are closed in the order of the operation opposite to the above.

In the case where the lids of a tape cassette are opened/closed in the above-depicted manner as in the conventional cassette loading apparatus, it becomes possible to open/close lids of the tape cassettes 28, 29 of different size shown in FIG. 8.

In general, when tape cassettes of different size and of the same system are loaded in the same apparatus, an opening portion 30 (indicated by oblique lines) at the front faces of the tape cassettes 28,29 is used in common, while the reels 31,32 and tape cassettes 28,29 are different in size. Each lid of the cassettes is formed in the same structure as described with reference to FIGS. 1 and 2.

Since the opening portion 30 is common for the tape cassettes 28,29, a rear lid 33 can be made common for both tape cassettes, as indicated in FIG. 8.

If the lids are opened/closed as in the foregoing conventional manner, a plurality of kinds of tape cassettes can be opened/closed by the single rear lid opener.

However, the rear lid opener 26 is brought to butt into contact with the lower end face 7a of the rear lid 7 in the prior art, as shown in FIG. 9, which causes a disadvantageous approach of the rear lid opener 26 to the tape 5 stretched in the opening 4 as the lid is being opened. Therefore, if the tape 5 gets slightly loose at this time, the rear lid opener 26 touches the tape 5, resulting in a damage or break of the tape.

Besides, since the lower end face 7a at the central part in an elongated direction thereof (part A in FIG. 1) is held in thrusting contact with the rear lid opener 26 so as to keep the lids opened, the central part A of the rear lid 7 is greatly deflected so much as to be deformed with time. Therefore, the height of the rear lid 7 in the elongated direction when it is opened is variously changed. Moreover, the above-mentioned deflection proceeds to an eternal deformation of the lid, generating a gap at a part 34 (FIG. 5) where the front lid 6 meets the lower end face 7a of the read lid 7 in the closing state. As a result, it disadvantageously takes place that dusts or the like evading through the gap are adhered to the tape 5, and an undesirable increase of drop-outs is noticed.

Furthermore, in the case where the front and rear lids of the tape cassettes 1,29 having large front lids 6,35 as shown in FIG. 1 or 8 are to be opened/closed, a considerable amount of load is required therefor. However, since the front and rear lids are opened/closed by the rear lid opener 26 alone in the prior art, the rear lid opener 26 cannot get rid of a great deal of load, whereby it may be broken or the rear lid of the tape cassette may be broken in some cases.

SUMMARY OF THE INVENTION

The present invention has been developed with a view to substantially eliminating the disadvantages as described below, and has for its essential object to provide a cassette loading apparatus capable of loading one or a plurality of tape cassettes.

Disadvantages

1. A damage or break of a tape as a tape cassette is loaded;
2. A variation in height of a rear lid when it is opened resulting from deformation thereof and an increase of drop-outs; and
3. A damage of a rear lid opener and the rear lid when a tape cassette having a large front lid is opened.

In accomplishing the above-described object, according to the present invention, a cassette loading apparatus is provided with a lid opening/closing means in the structure so designed as described below.

Means

1. An opener is brought to butt against a bracket part of a rear lid of a tape cassette, thereby opening the lids;
2. An opener is brought to butt against both front and rear lids, thereby opening the lids; and
3. There are provided a cassette holder for holding cassettes of different outer size, a front lid opener supported rotatable by said cassette holder and urged in one direction by a spring, a kick pin built in said front lid opener, a kick plate to be engaged with said kick pin when said cassette holder is moved within a recording-/reproducing apparatus, a large protrusion formed by projecting a part of said front lid opener to be engaged with a lid opening portion of a large cassette, a small cassette front lid opener rotatably supported on said front lid opener and urged in one direction by a spring, a small protrusion formed by projecting a part of said small cassette front lid opener to be engaged with a lid opening portion of a small cassette, and a cassette detecting lever rotatable supported on said front lid opener. The cassette detecting lever is located at such a position that it does not butt against a small cassette when the small cassette is inserted into the cassette holder, but is stationary, whereas it butts against a large cassette to rotate when the large cassette is inserted into the cassette holder. The small protrusion of the small cassette front lid opener is engaged with the lid opening portion of the small cassette when the small cassette is inserted into the cassette holder, and the pick pin is brought to butt against the kick pin to rotate the front lid opener when the cassette holder is moved within the recording/reproducing apparatus, the lids of the small cassette are opened through the rotating movement of the front lid opener and engagement between the small protrusion and lid opening portion of the small cassette. On the other hand, the cassette detecting lever is rotated to rotate the front lid opener of the small cassette when the large cassette is inserted into the cassette holder, thereby releasing the engagement between the small protrusion on the front lid opener of the small cassette and front lid of the cassette is released, and at the same time the large protrusion of the front lid opener is engaged with the lid opening portion of the large cassette and the kick pin is brought to butt against the kick plate to rotate the front lid opener when the cassette holder is moved within the apparatus, whereby the lids of the large cassette are opened through the rotating movement of the front lid opener and engagement between the large protrusion and large opening portion.

More specifically, by means 1, the bracket part of the rear lid of the tape cassette is spaced farther from the stretching tape than the lower end face of the rear lid. Accordingly, even when a rear lid opener of the apparatus butts against the bracket part in opening/closing the lids, the contact between the rear lid opener and tape can be avoided, thereby preventing generation of a tape damage or tape break. Since guide pins formed in the bracket part are supported by guide grooves in the main body of the tape cassette, even the external stress would not deform the rear lid. In .consequence, the height of the rear lid when it is opened can be maintained constant, and no gap is produced between the front and rear lids, whereby an increase of drop-outs resulting from the invasion of dusts can be prevented.

By means 2, the rear lid and front lid of the tape cassette are opened/closed through thrusting contact therebetween, so that the load applied to the rear lid opener can be reduced. Accordingly, the rear lid opener and rear lid alike can be prevented from being broken. Moreover, if an opening/closing means for the rear lid is constituted equivalent to the means 1, similar effects can be expected.

By means 3, it becomes possible to determine an alternative one among a plurality of the tape cassettes loaded into the apparatus and to open/close the front lid by a front lid opener in correspondence to the size of the selected tape cassette. Accordingly, a plurality of tape cassettes having different size can be loaded in the same apparatus.

Since a means to push up the rear lid of the tape cassette is not provided in the apparatus, it is possible to prevent a tape damage, tape break or deformation of the rear lid encountered in the prior art.

In addition, according to an embodiment III of the present invention, restrictions on the structure of a lid for each tape cassette can be removed as described below, whereby a plurality of tape cassettes having different structure of lids can be loaded in the same loading apparatus;

1. It is not necessary to provide a rear lid for each tape cassette. Even if a rear lid is formed for each tape cassette, the rear lid is not necessary to be common; and 2. The position of the opening portion of the front lid of each tape cassette is not necessary to be made common.

The above and other objects and features of the present invention will appear in the following description and appended claims, reference being made to the accompanying drawings forming a part of this specification wherein like reference characters designate corresponding parts in the several views.

BRIEF DESCRIPTION OF THE DRAWINGS

FIG. 39 is a perspective view of a cassette-uptype moving means for moving a cassette holder.

DETAILED DESCRIPTION OF THE PREFERRED EMBODIMENTS

A cassette loading apparatus of the present invention will be discussed hereinbelow in a detailed manner in conjunction with preferred embodiments thereof.

Embodiment Ia

Figure 1:
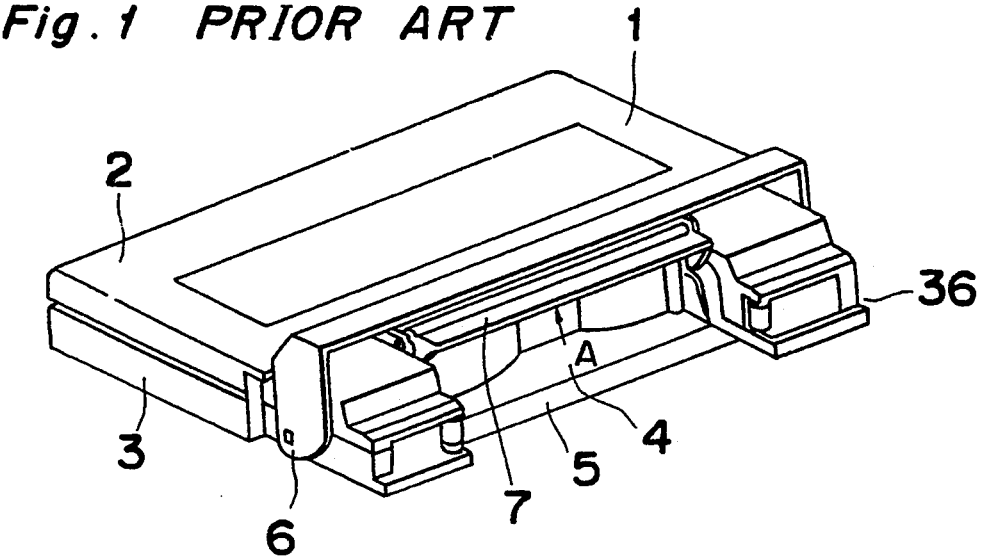
FIG. 1 is a perspective view of a conventional tape cassette.
Figure 2:
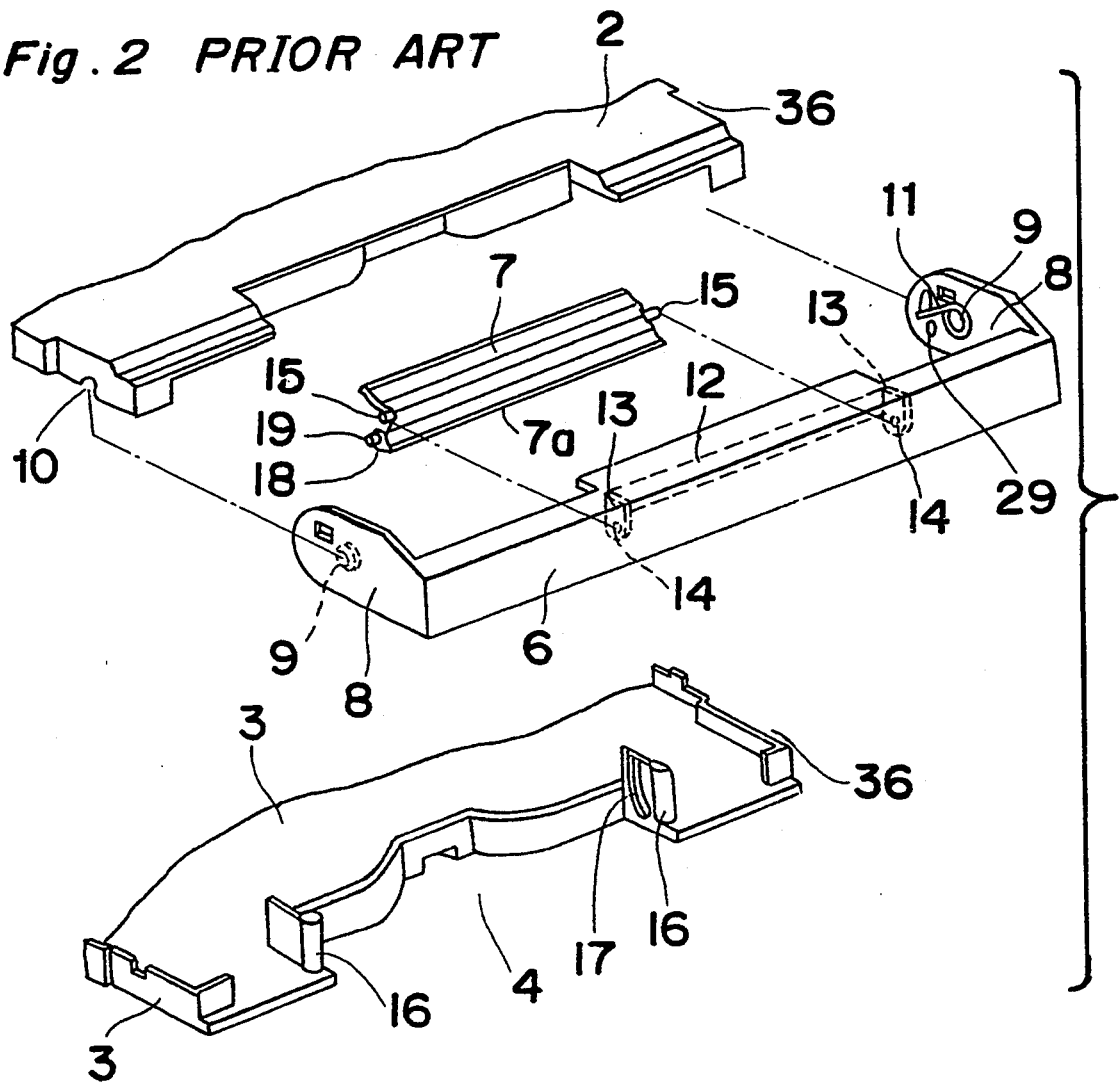
FIG. 2 is an exploded perspective view of a lid portion of the conventional tape cassette.
Figure 3:
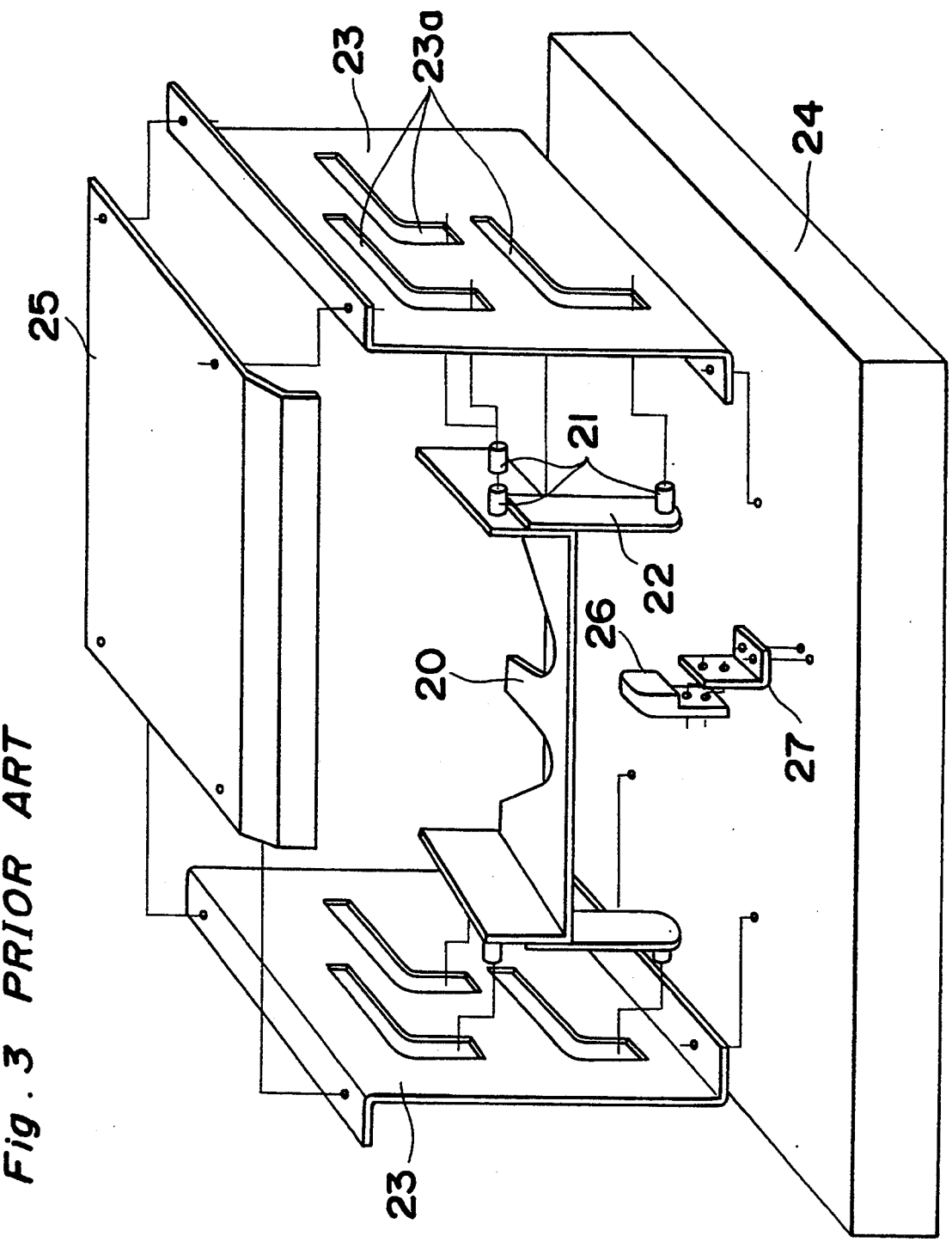
FIG. 3 is an exploded perspective view of a conventional cassette loading apparatus.
Figure 4:
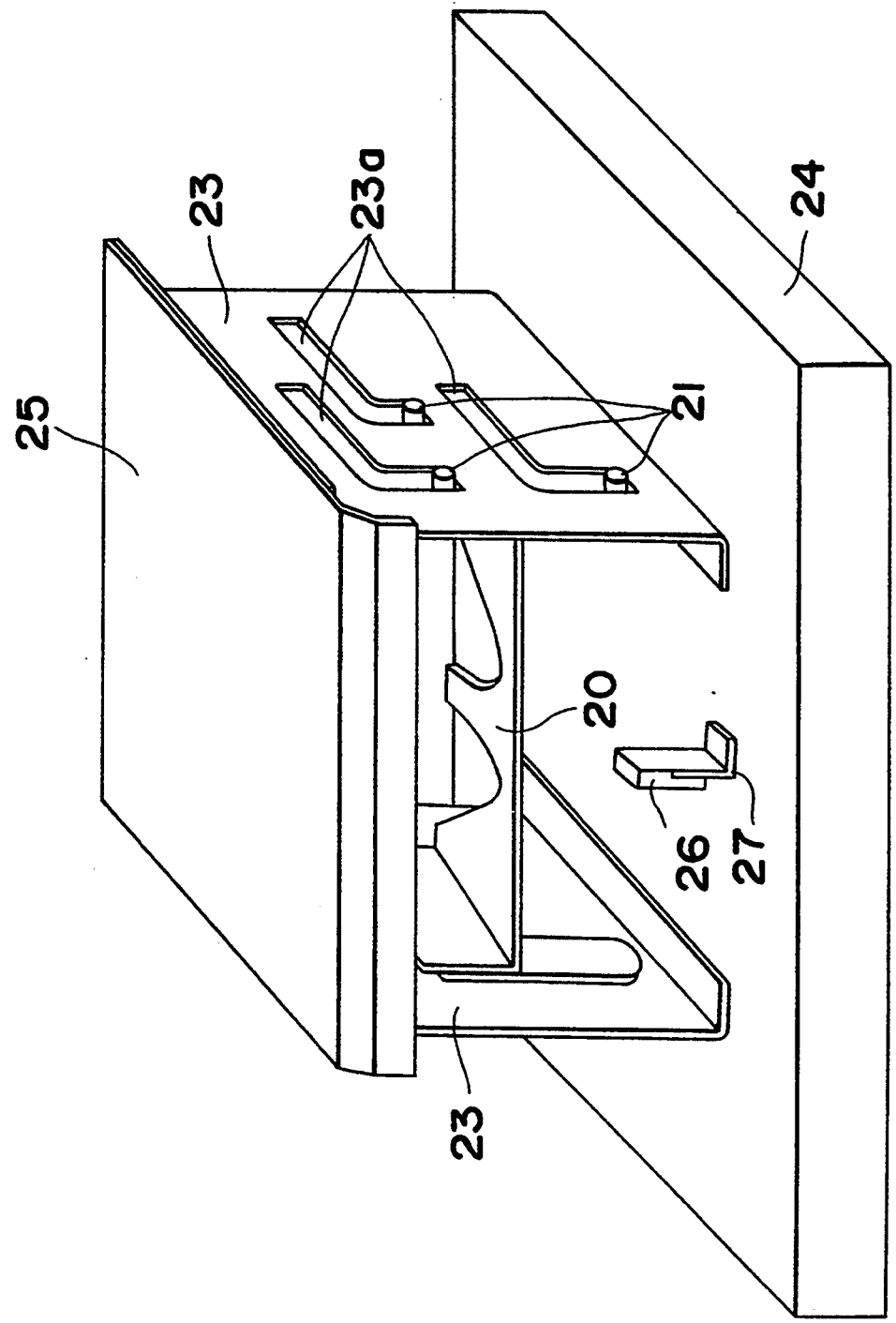
FIG. 4 is a perspective view of the apparatus of FIG. 3.
Figure 5:
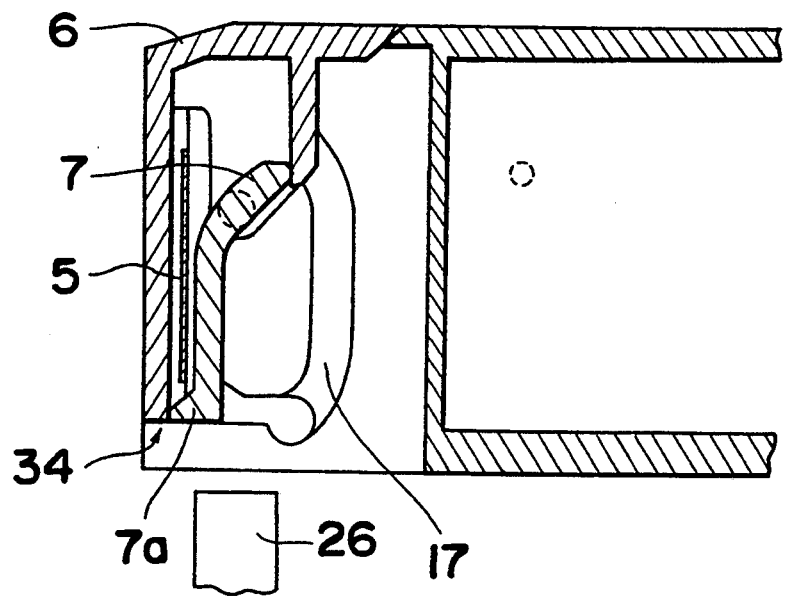
FIGS. 5 and 6 are cross sectional views of a fundamental part of a lid portion of a tape cassette explanatory of a lid opening means of the apparatus of FIG. 3.
Figure 6:
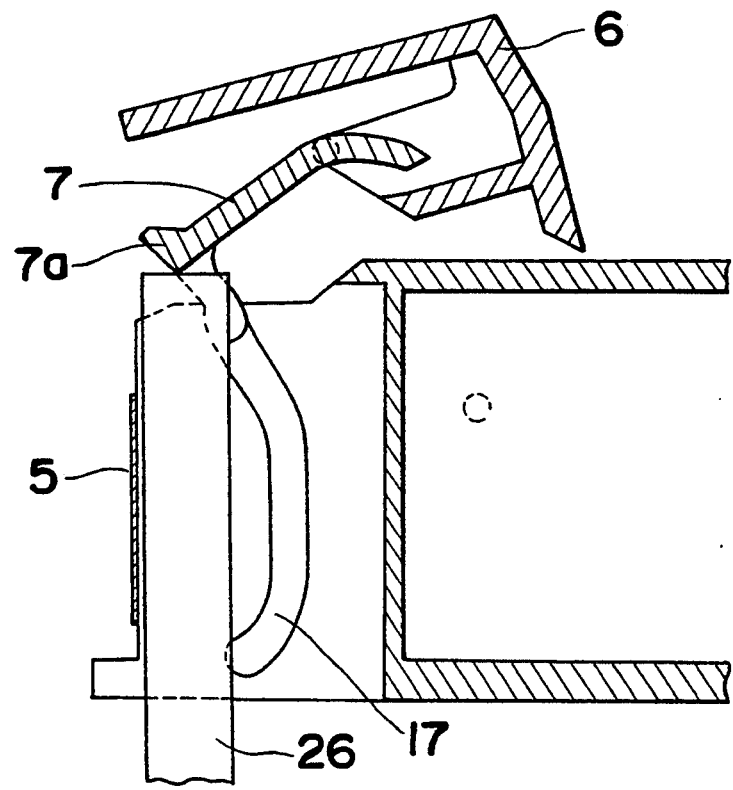
Figure 7:
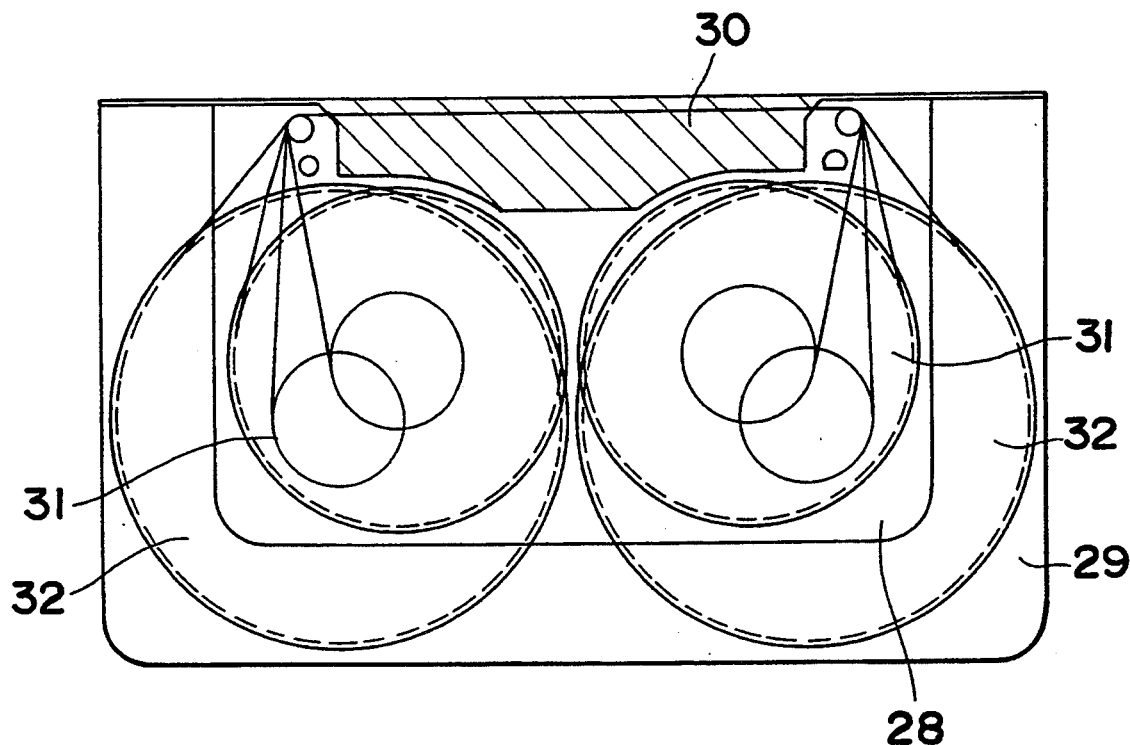
FIGS. 7 and 8 are plane views of tape cassettes of different size and of the same system.
Figure 8:
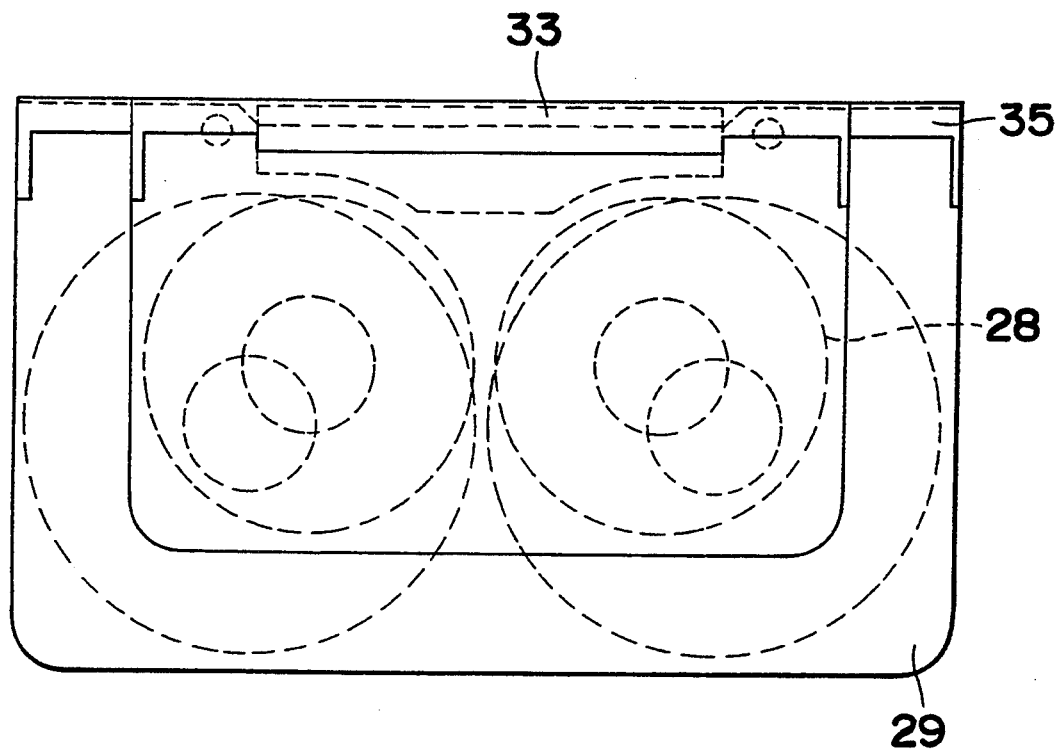
Figure 9:
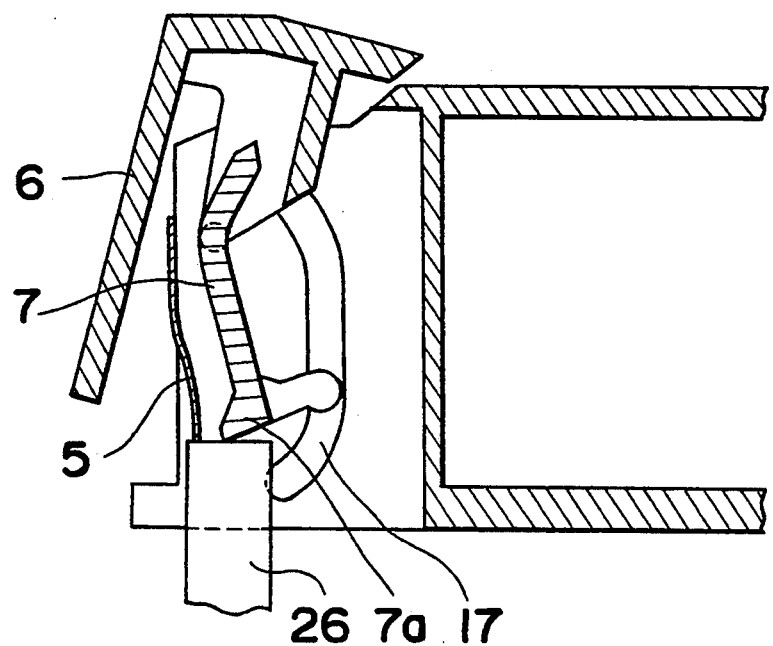
FIG. 9 is a cross sectional view of a fundamental part of the lid portion of a tape cassette explanatory of the lid opening means of the apparatus of FIG. 3.
Figure 10:
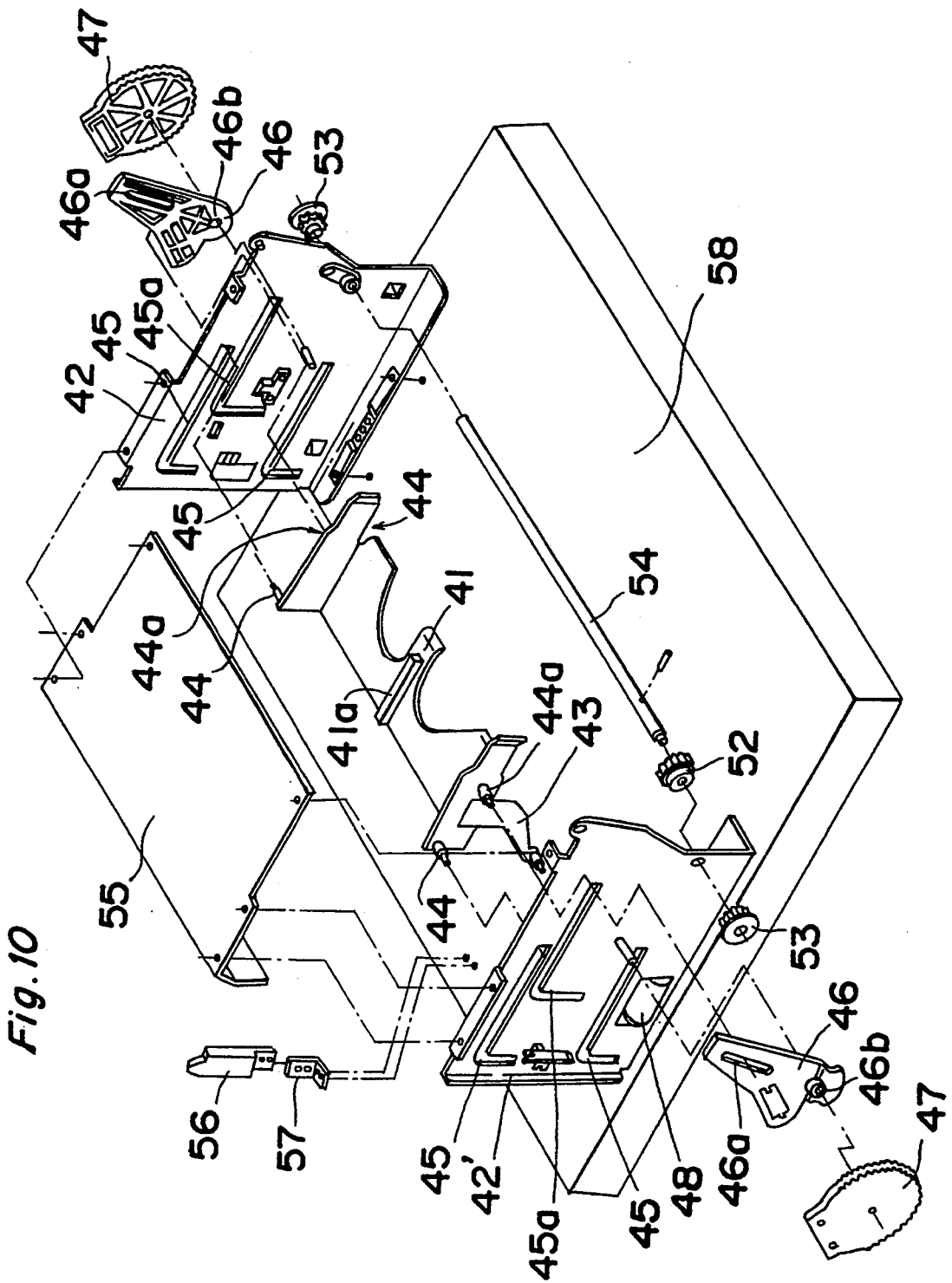
FIG. 10 is an exploded perspective view of a cassette loading apparatus according to an embodiment Ia of the present invention.
Figure 11:
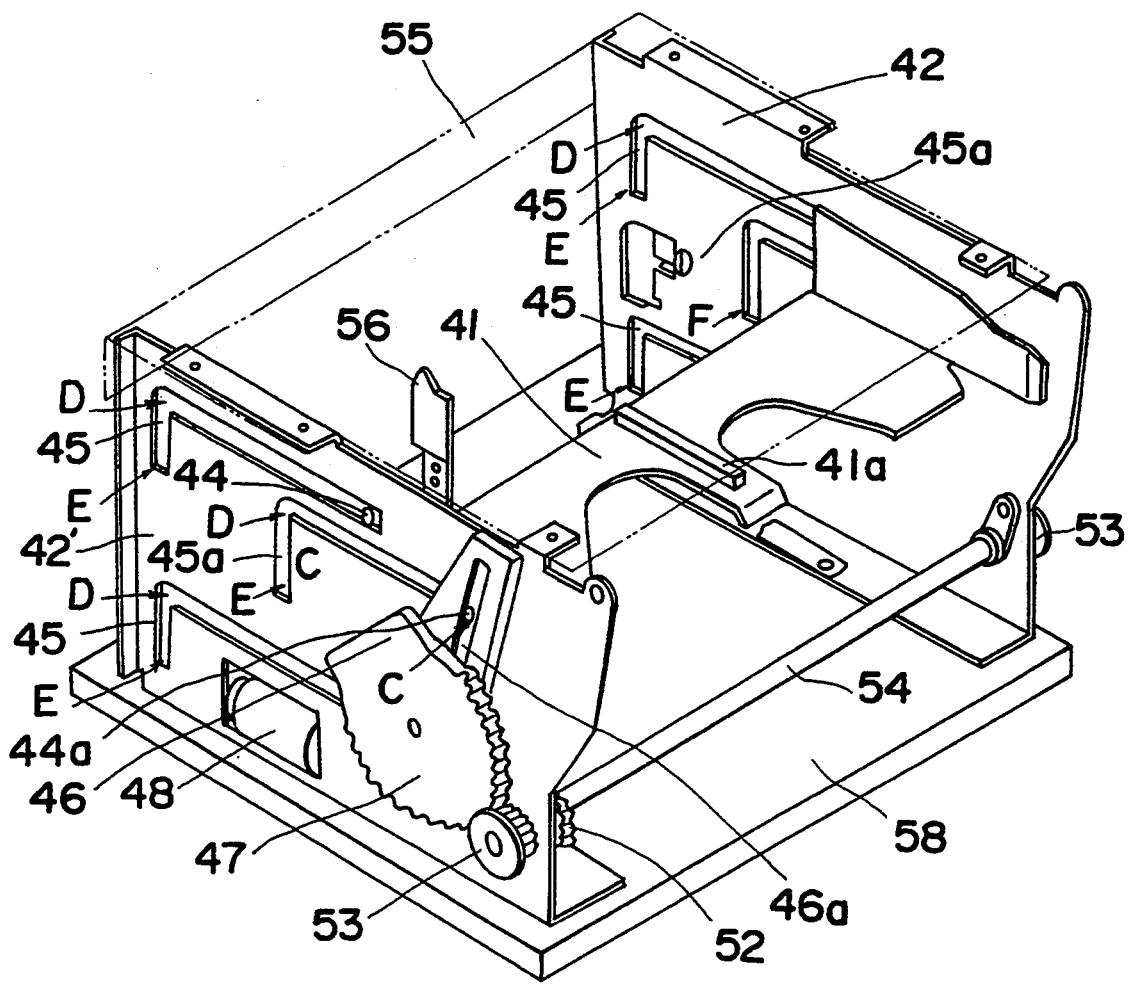
FIG. 11 is an assembled perspective view of the apparatus of FIG. 10.

FIGS. 10 and 11 are an exploded perspective view and an assembled perspective view of a cassette loading apparatus according to an embodiment Ia of the present invention.

In FIG. 10, a cassette holder 41 supports a tape cassette 59. A cassette guide protruding part 41a of the cassette holder 41 guides the tape cassette 59 to a predetermined position through engagement with a cassette guide groove 59e which will be described later and is formed in the bottom surface of the tape cassette 59. A pair of right and left guide angles 43 are fixed to the cassette holder 41, and guide pins 44, 44a are provided on the cassette holder 41 to guide the guide angles 43. A pair of side plates 42, 42' at both sides of the cassette holder 41 are fixed to a chassis 58. Each side plate 42 or 42' has L-shaped guide grooves 45, 45a to guide the guide pins 44, 44a. A pair of wiper arms 46 are mounted at the opposite sides of the side plates 42, 42' in a rotatable manner around respective fulcrums 46b. Each wiper arm 46 has a slide groove 46a in which a corresponding guide pin 44a is engaged to cause the guide pin 44a to move along the L-shaped guide groove 45a. A wiper gear 47 is secured to the wiper arm 46 also in a rotatable manner around the fulcrum 46b.

A driving motor 48 is placed inside the side plate 42'.

Figure 12:
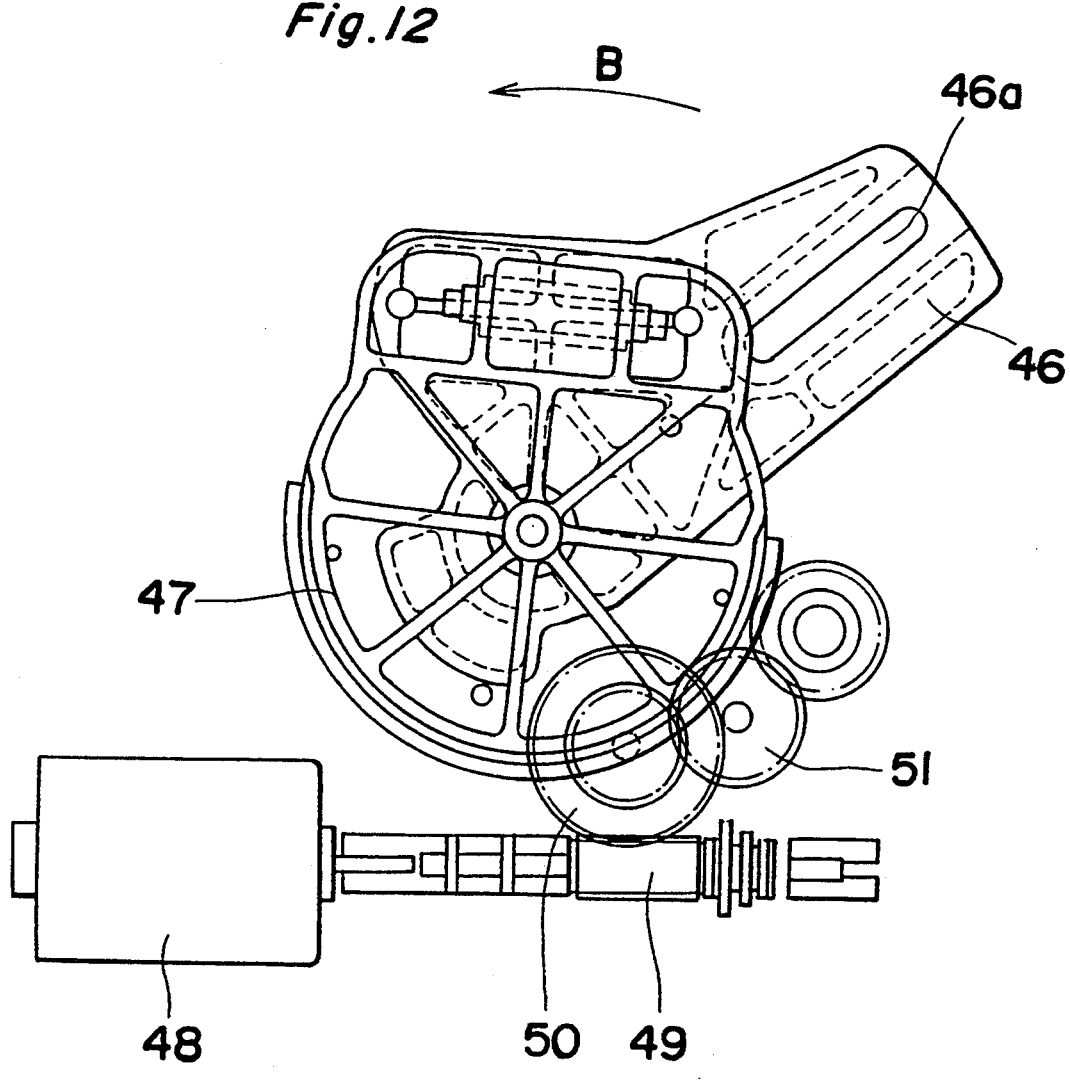
FIG. 12 is a cross sectional view of a fundamental part of a driving unit of the apparatus of FIG. 10.

FIG. 12 is a cross sectional view of a fundamental part of a driving unit.

As indicated in FIG. 12, a worm gear 49 is coupled to the driving motor 48 to drive a gear C52 through gears A50 and B51. (The gears A50, B51 and C52 are at the inner side of the side plate 42'.)

The gear C52 has its one end fixed to a shaft 54 which is rotatably supported at both ends thereof by the side plates 42, 42'. Moreover, a pair of gears D53 fixed to the opposite ends of the shaft 54 (at the outer side of the side plates 42, 42') are meshed with a pair of wiper gears 47.

A top plate 55 connecting the side plates 42, 42' from above is so mounted as to maintain a rigidity sufficient to support the entire body of the cassette loading apparatus.

A rear lid opener 56 is fixedly secured to a chassis 58 via a mounting plate 57.

The tape cassette 59 loaded in the cassette loading apparatus of the present invention will now be described with reference to FIGS. 13 and 14.

Figure 13:
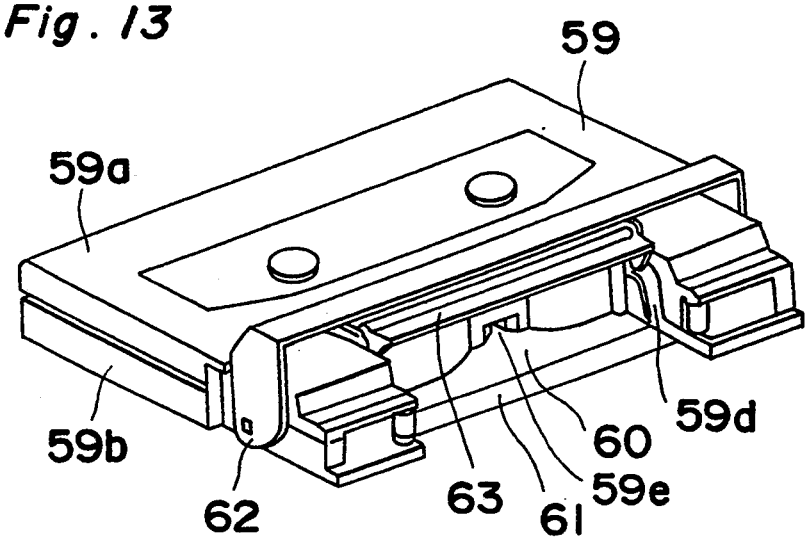
FIG. 13 is a perspective view of a tape cassette loaded in the apparatus of FIG. 10.

As shown in FIG. 13, the tape cassette 59 is constituted by an upper half 59a and a lower half 59b. There is an opening port 60 formed at the front surface of the tape cassette 59. A tape 61 is stretched across the opening port 60, which is normally covered with a front lid 62 and a rear lid 63.

Figure 14:
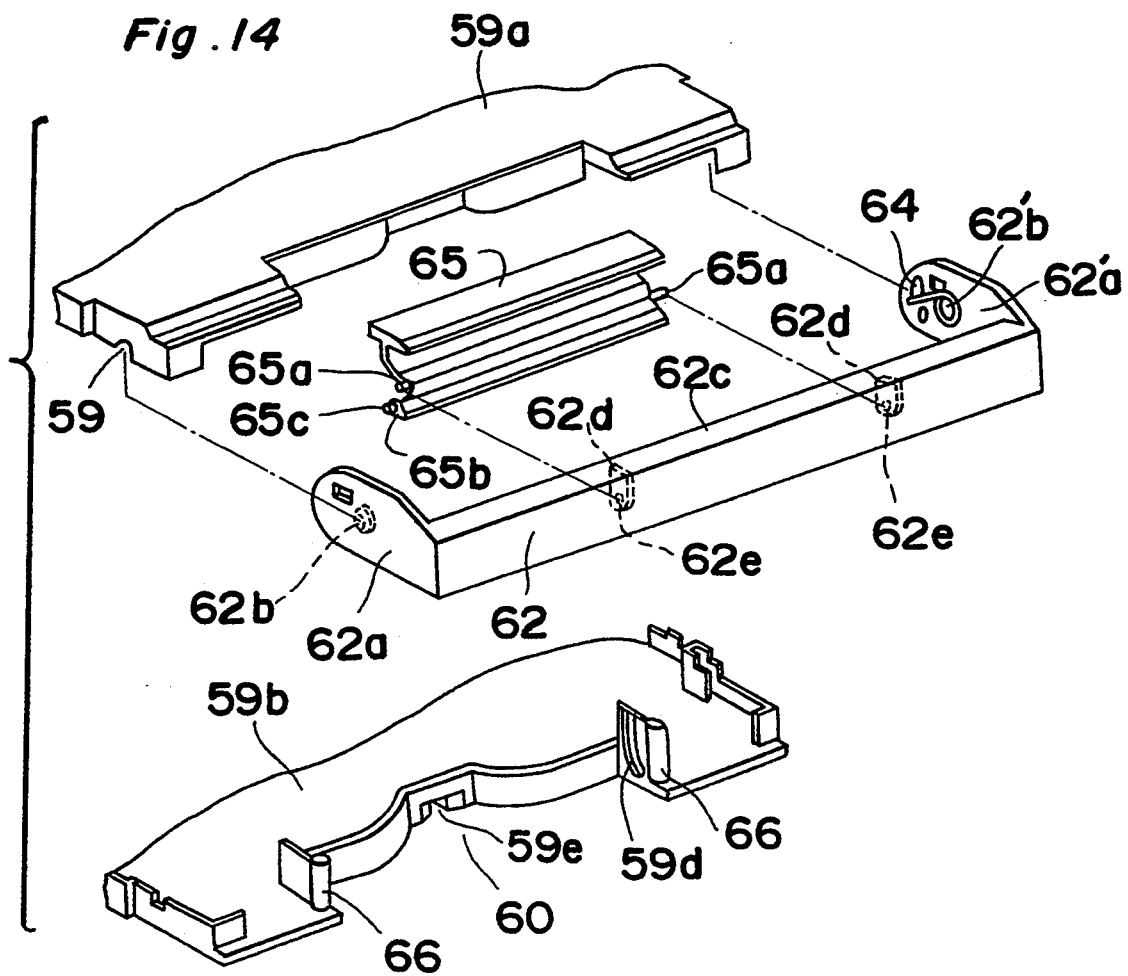
FIG. 14 is an exploded perspective view of a lid portion of the tape cassette of FIG. 13.

The front lid 62 is, as seen in FIG. 14, generally U-shaped and supported on a pair of fulcrum pins 62b at the right and left side faces 62a thereof. The fulcrum pins 62b are inserted into a pair of notches 59c formed at the right and left side faces of the upper half 59a. The front lid 62 is rotatable around the fulcrum pins 62b. The coil spring 64 is mounted at the side of a fulcrum 62'b to urge the front lid 62 to rotate in a closing direction.

A pair of bracket parts 62d are provided on the lower surface of an upper lid section 62c of the front lid 62. A pair of supporting pins 65a at the right and left ends of a rear lid 65 are inserted into pin holes 62e of the bracket parts 62d. Therefore, the rear lid 65 is turnable around the supporting pins 65a.

In the lower half 59b, a pair of rear lid guide grooves 59d are formed in a piece behind a pair of tape guides 66. A pair of guide pins 65c is provided on rearwardly extending bracket parts or protrusions 65b at the right and left ends of the rear lid 65 and the pins 65c are slidably supported in the rear lid guide grooves 59d. The cassette guide groove 59e is formed in the lower half 59b. Since the front lid 62 and rear lid 65 of the tape cassette 59 are coupled to each other, it is possible to apply an opening force to either of the two when the lids are to be opened simultaneously.

Secondly, the operation when the tape cassette 59 is to be loaded into the cassette loading apparatus of the embodiment Ia with the construction as described above will be explained.

When the tape cassette 59 is inserted into the cassette holder 41, the cassette guide protruding part 41a of the cassette holder 41 is engaged with the cassette guide groove 59e of the tape cassette 59 and guided to a predetermined position, when a cassette detecting switch (not shown) built in the apparatus is actuated thereby to drive the driving motor 48.

In consequence, the worm gear 49 coupled to the driving motor 48 is rotated to rotate the pair of wiper gears 47 through the gears A50, B51, C52 and D53, as is understood from FIG. 12. Accordingly, the pair of wiper arms 46 fixed to the wiper gears 47 are rotated in the direction of an arrow B.

Subsequent to the above movement, the guide pins 44a slidably supported in the slide grooves 46a of the wiper arms 46 are moved in a horizontal direction from a position C to a position D in the L-shaped guide grooves 45a, and then in a vertical direction from the position D to a position E shown in FIG. 11. Simultaneously, the other guide pins 44 are moved along the L-shaped guide grooves 45 (C-D-E).

The cassette holder 41 on which the guide pins 44, 44a are mounted is accordingly moved along the L-shaped guide pins 45, 45a in the horizontal and vertical directions (C-D-E). As a result, the tape cassette 59 supported by the cassette holder 41 is loaded at a predetermined position within a recording/reproducing apparatus.

During the vertical movement of the cassette holder 41 (D-E), as will be explained below, the rear lid opener 56 of the loading apparatus will be abutted by the downwardly moving bracket part 65b of the rear lid 65, so that the rear lid 65 is opened.

Figure 15:
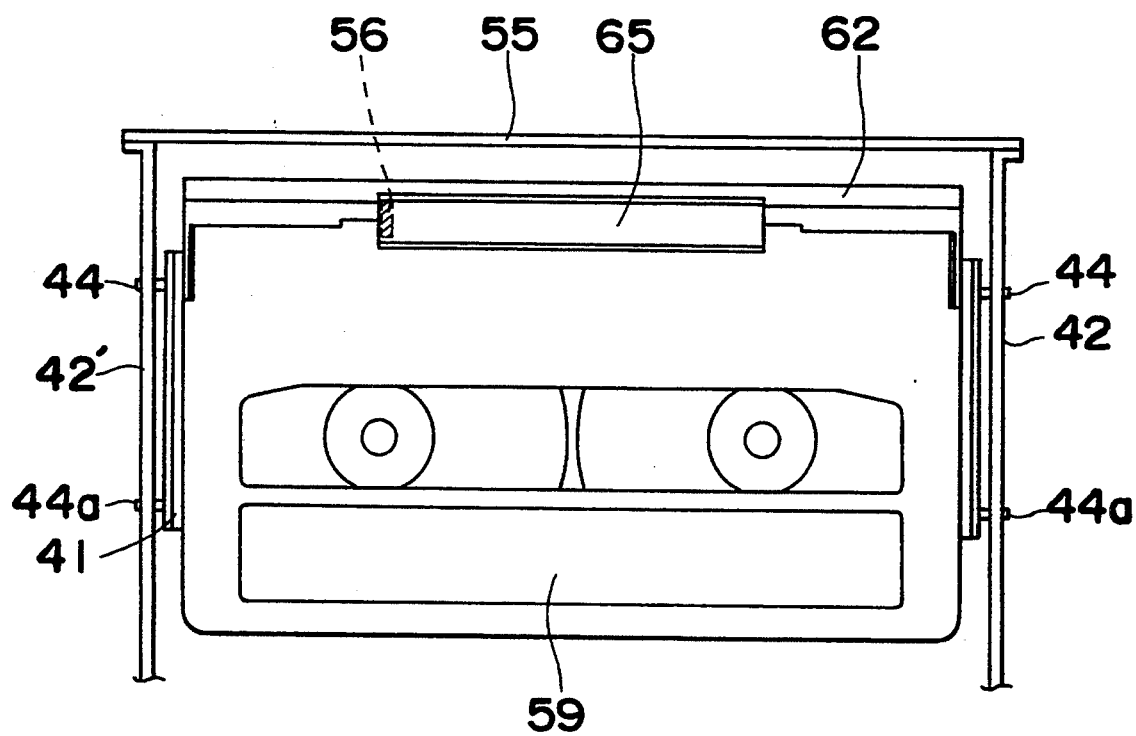
FIG. 15 is a plane view of a fundamental part when the tape cassette is loaded in the cassette loading apparatus.

FIG. 15 shows a plan view when the cassette holder 41 is moved in the horizontal direction to the position D. The rear lid opener 56 indicated by hatching lines is located below one of the bracket parts 65b of the rear lid 65 of the tape cassette 59. It has an upwardly extending protruding part 56a on a portion of the upper end which is toward the closed position of the rear lid and a recess 56b on a portion which is remote from the closed position of the rear lid having a shape for accommodating one of the protruding parts 65b when the rear lid is in the open position.

Figure 16:
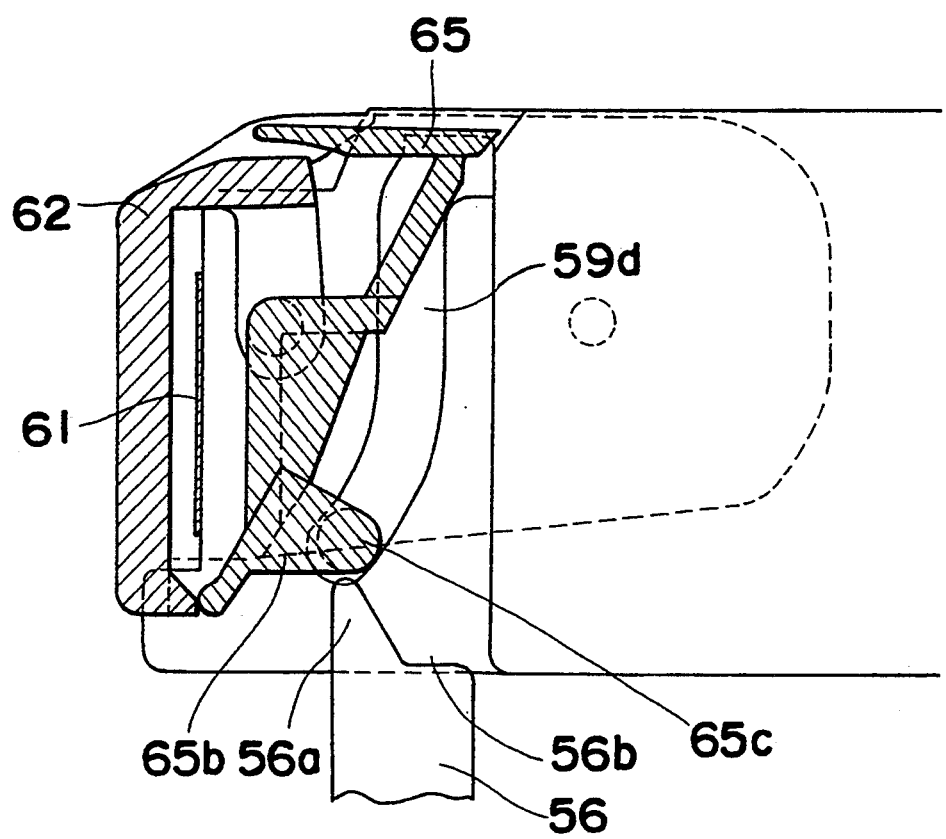
FIGS. 16, 17 and 18 are cross sectional views of a fundamental part of a lid portion of the tape cassette explanatory of a lid opening means of the cassette loading apparatus of FIG. 10.

FIG. 16 is a cross sectional view showing fundamentally the state when the lids are started to be opened. At the start of opening, the protruding part 56a of the rear lid opener 56 is abutted by a part of the bracket part 65b from which a guide pin 65c projects from the bracket part 65b. As the tape cassette 59 is moved downwards, the rear lid 65 is pressed against the rear lid opener 56 and guided along the pair of guide grooves 59d by the pins 65c. Likewise, the front lid 62 having the rear lid 65 rotatably mounted therewith is turned in the opening direction against the force of the coil spring 64.

Figure 17:
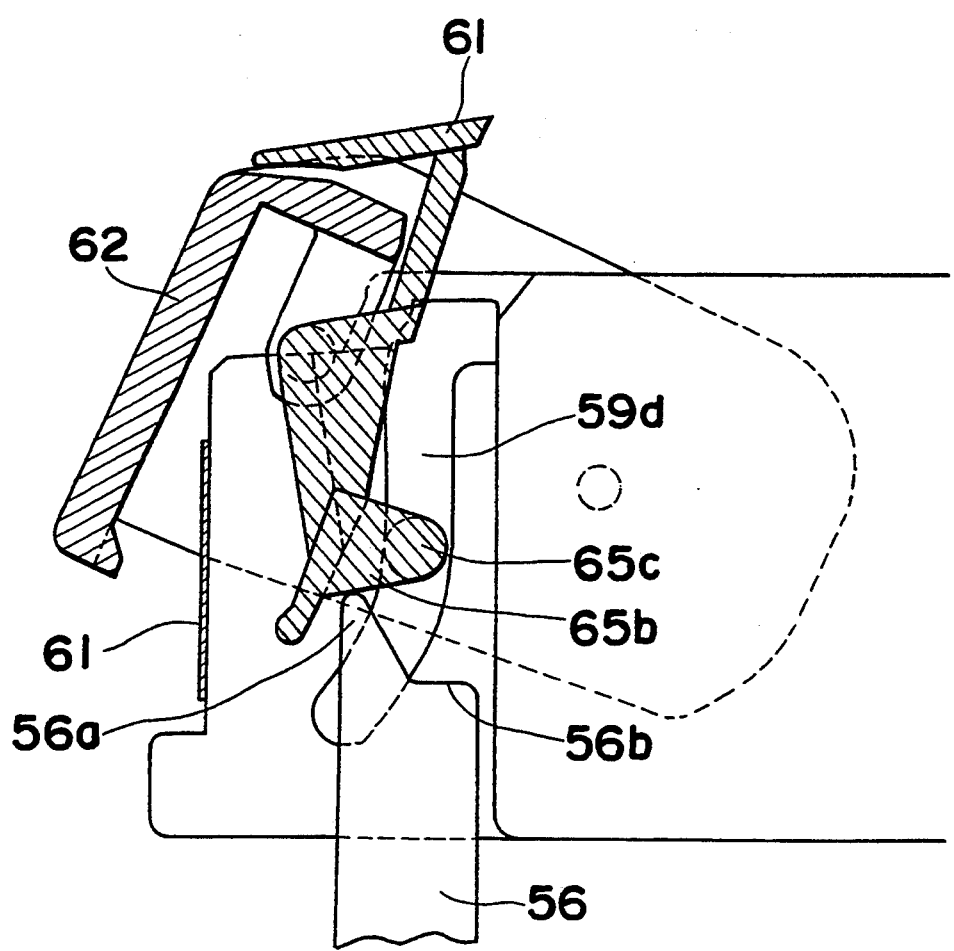

FIG. 17 is a cross sectional view fundamentally illustrating the state when the lids are being opened. At this time, the protruding part 56a of the rear lid opener 56 is pressed in contact with the bracket part 65b at a position spaced from the guide pin 65c. This is because the bracket parts 65b of the rear lid 65 move in a rotary locus in a direction away from the tape 61 due to the configuration of the guide grooves 59d of the tape cassette 59.

Figure 18:
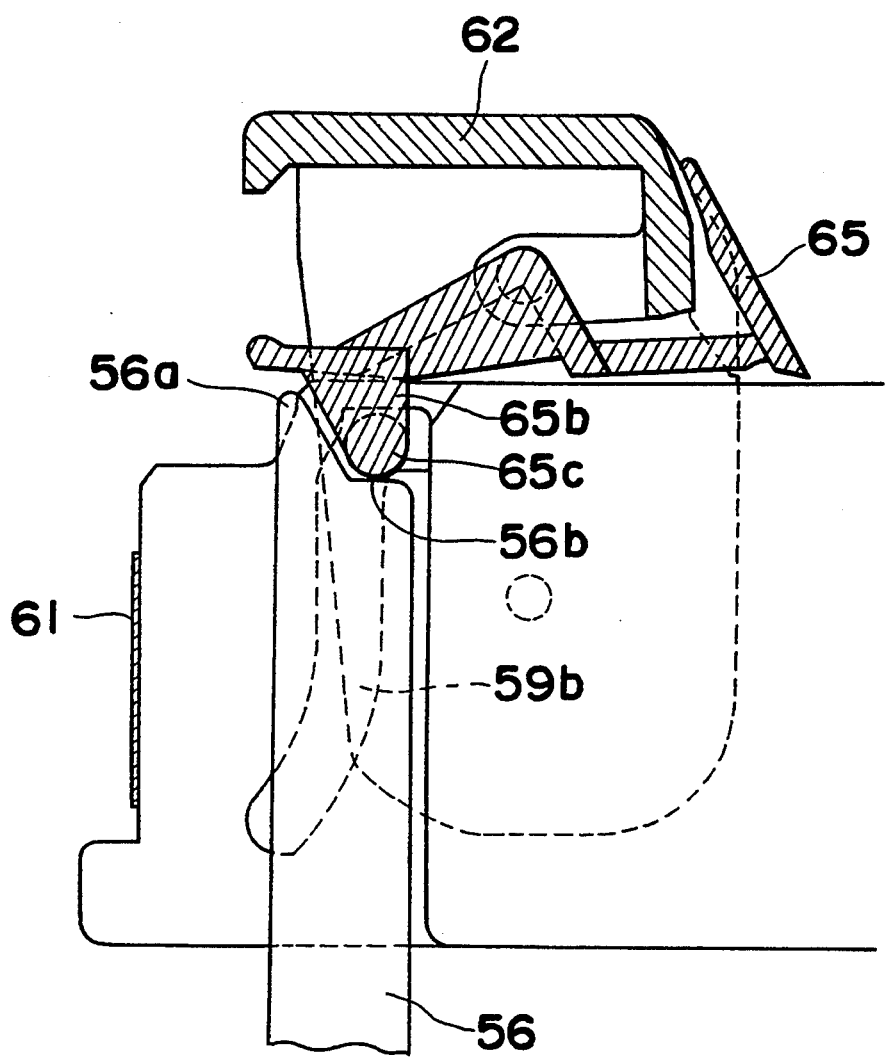

FIG. 18 is a cross sectional view fundamentally showing the state when the lids are completely opened. At this time, the recess 56b of the rear lid opener 56 receives the bracket part 65b with the guide pin 65c, so that the rear and front lids are kept opened.

The front and rear lids 62, 65 of the tape cassette 59 are opened in the above-described manner, and will be closed by an operation reverse to the above.

Figure 19:
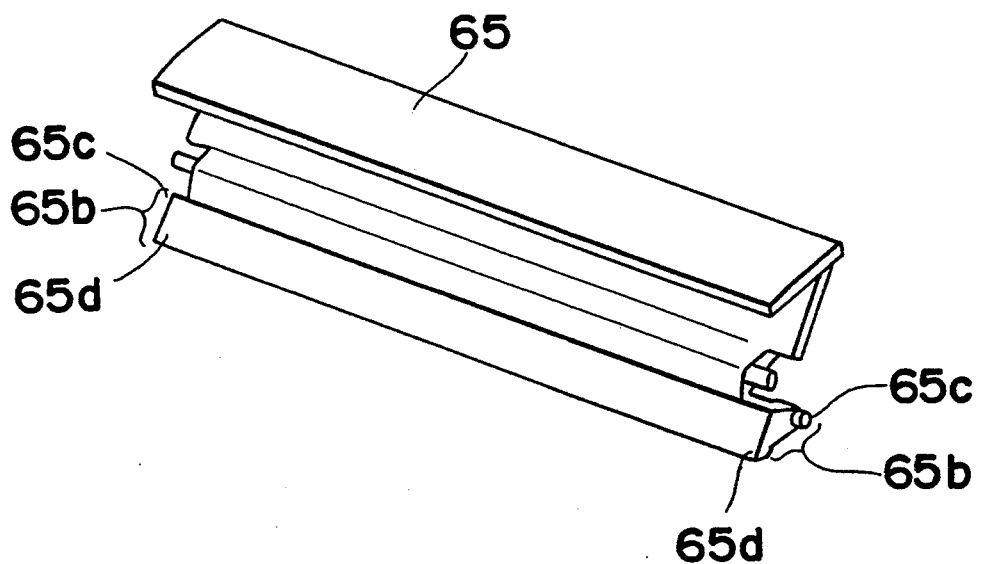
FIG. 19 is a perspective view of a rear lid of the tape cassette.

As shown in FIG. 19, the bracket parts 65b are formed at the lateral sides in the lower part of the rear lid 65.

Figure 20:
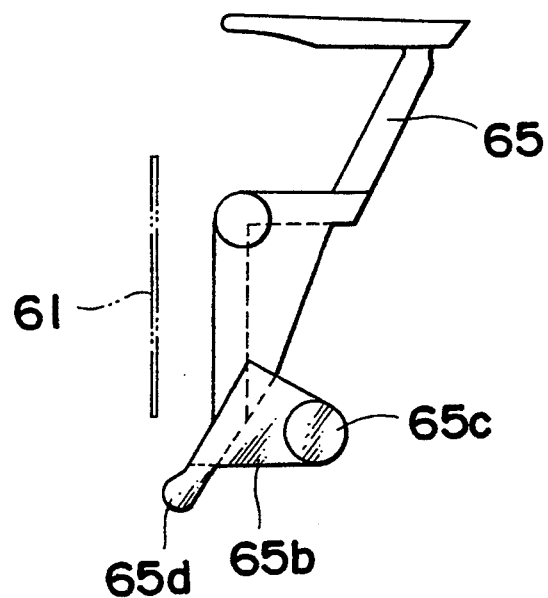
FIG. 20 is a side elevational view of the rear lid of the tape cassette.

FIG. 20 is a side elevational view of the rear lid 65, in which the bracket part 65b is shown as protruding in a direction away from the tape 61. Numeral 65c is the guide pin formed on the bracket part 65b. It is necessary to form the rear lid opener 56 of rigid material so that it can stand the load applied thereto in opening the front and rear lids 62, 65 against the coil spring 64. The material of the rear lid opener 56 may accordingly be anything such as metal, synthetic resin, etc. so long as it bears the load.

According to the embodiment Ia, as shown in FIGS. 16–18, the front and rear lids are opened by causing the rear lid opener 56 to be abutted by the bracket part 65b of the rear lid 65 at a point spaced from the tape 61. Therefore, even if the tape 61 gets loose, it is prevented from being pressed into engagement with the rear lid opener 56, so that damage to or breaking of the tape can be avoided.

Additionally, although the lids are kept opened through contact between the rear lid opener and the central part of the lower surface in the elongated direction of the rear lid in the prior art, which may cause a deformation of the central part of the rear lid, in the present invention the lids are maintained in the opened state according to the embodiment Ia with the rear lid opener 56 in pressed contact with the portion of the bracket part 65b of the rear lid 65 which carries pin 65c as shown in FIG. 18.

Accordingly, the present invention can prevent the deformation of the rear lid 65, whereby the shape of the rear lid can be prevented from being changed. Since no gap is formed between the rear lid 65 and front lid 62 when the lids are closed, dust or the like is not allowed to enter the cassette. Therefore, an increase of drop-outs can be prevented.

Figure 30:
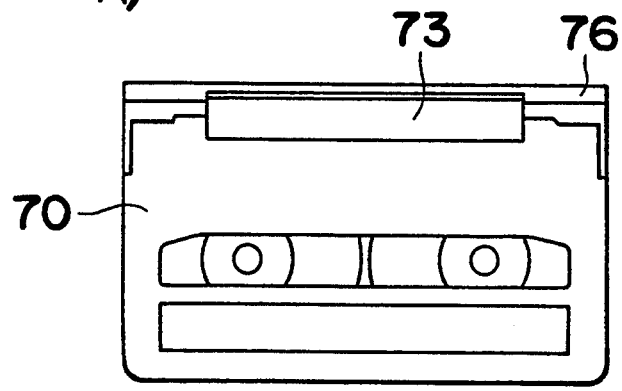
FIG. 30 is a plane view of tape cassettes of the same system and of different size.
Figure 30:
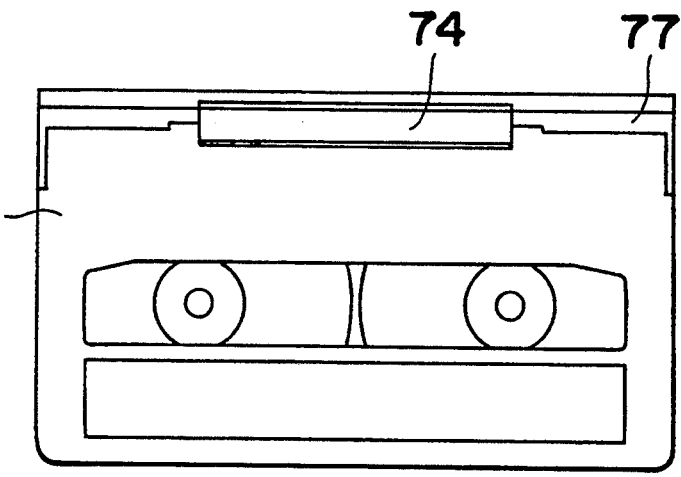
Figure 30:
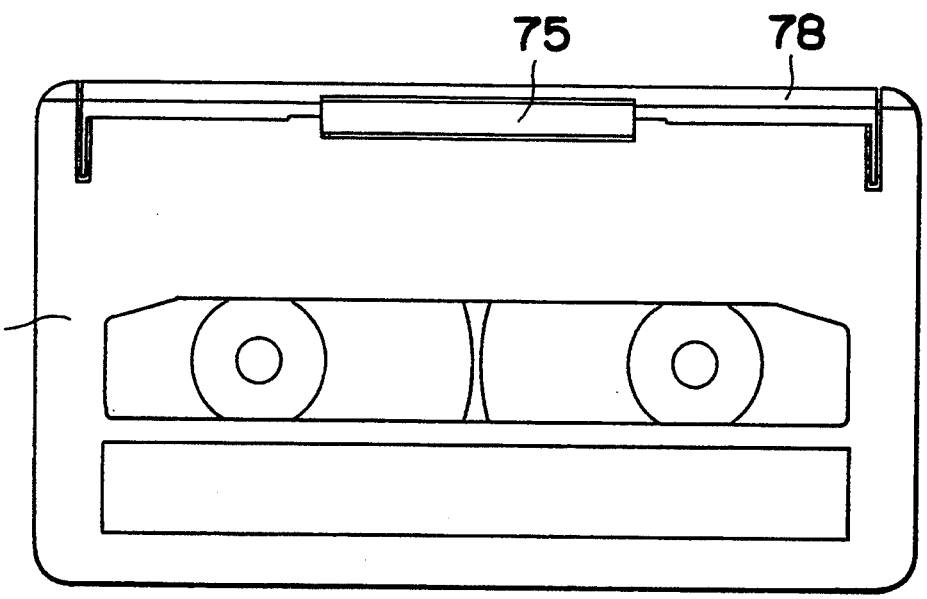
Figure 31:
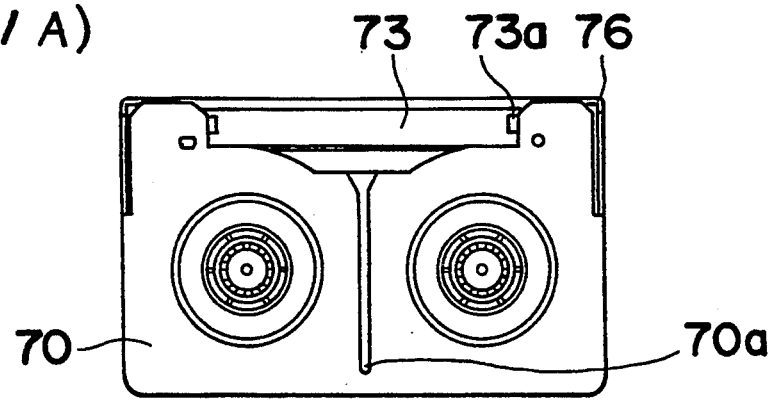
FIG. 31 is a bottom view of tape cassettes of the same system and of different size.
Figure 31:
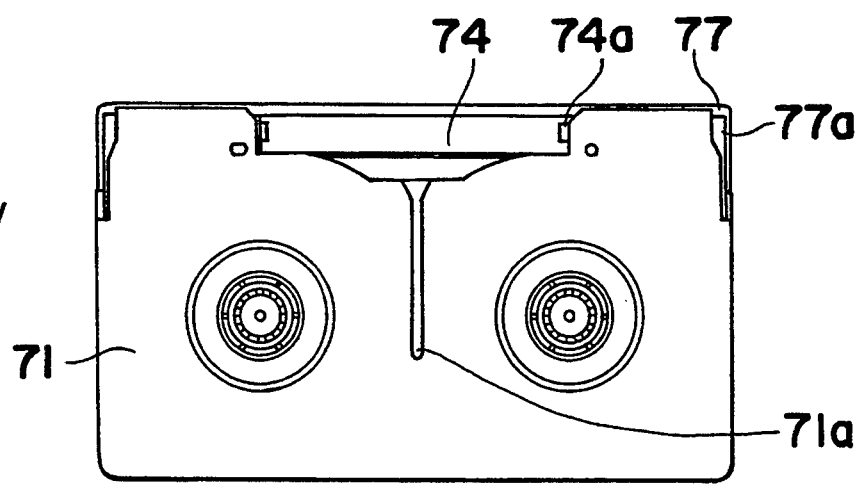
Figure 31:
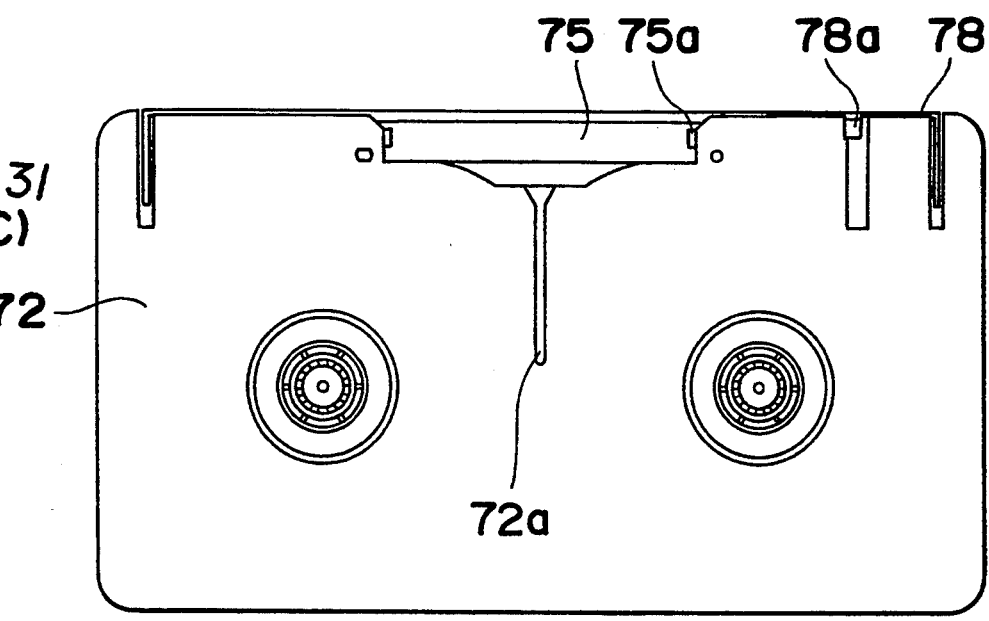
Figure 31:
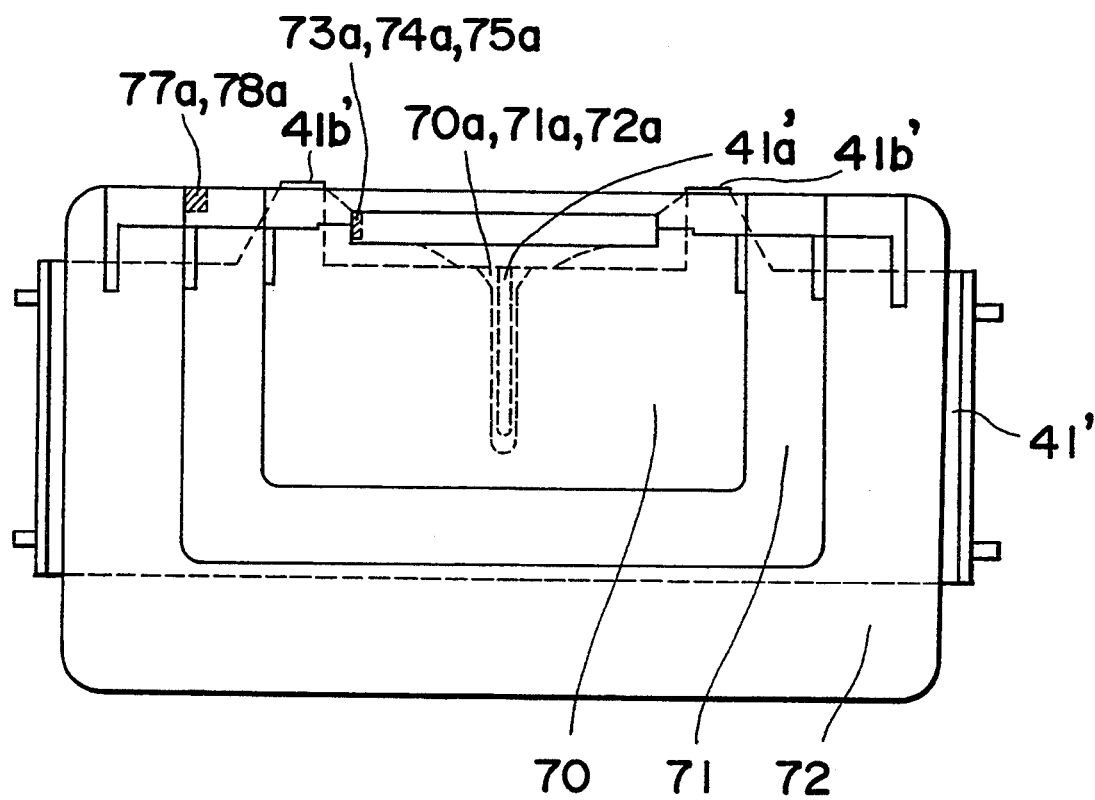

Furthermore, in the above structure of the embodiment Ia, a plurality of tape cassettes 70, 71, 72 of different sizes, but having bracket parts or protrusions 73a, 74a, 75a of the rear lids 73, 74, 75 in the same positions, as shown in FIGS. 30 and 31, can be advantageously opened by the single rear lid opener 56. It is to be noted that the lids of the tape cassettes of FIGS. 30 and 31 are constructed in the same manner as in FIGS. 13 and 14. Cassette guide grooves 70a, 71a, 72a are formed at a common position at the bottom surface of the tape cassettes 70, 71, 72 respectively. When the tape cassettes are inserted in the cassette holder 41', as shown in FIG. 31D, the guide grooves 70a, 71a, 72a are engaged with a cassette guide protruding part 41a' of the cassette holder 41' to be retained at a predetermined position. FIG. 31D shows the state where the three cassettes 70, 71, 72 are held in the cassette holder 41', more particularly, protrusions 73a, 74a, 75a of the tape cassettes 70, 71, 72 are retained at a common position as indicated by hatching lines. Therefore, the lids of all the tape cassettes 70, 71, 72 can be opened by the single rear lid opener 56.

Since it is so arranged according to the embodiment Ia that the lids 62, 65 of the tape cassette 59 are opened/closed by bringing the bracket part 65b of the rear lid 65 down against the lid opener, tape damage or tape breakage, etc. encountered in the prior art because of the direct contact between the rear lid opener and the tape can be prevented.

In addition, the deformation of the rear lid 65 can be prevented, so that the height of the rear lid 65 when it is opened is not changed. Moreover, since no gap is produced between the front and rear lids when the lids are closed, an increase of drop-outs of the tape due to invasion of dust can be prevented.

In addition, a plurality of the tape cassettes can be opened/closed by one rear lid opener.

Embodiment Ib

In the foregoing embodiment Ia, the front and rear lids 62, 65 of the tape cassette 59 are opened/closed by causing the rear lid opener 56 to be abutted by the bracket part 65b of the rear lid 65. However, the same effect can be achieved by the arrangement of embodiment Ib whereby a rear lid opener 56' is abutted by the bracket part and its vicinity (projecting portion 65d which will be described later) of the rear lid 65.

Embodiment Ib will be discussed hereinbelow.

Figure 21:
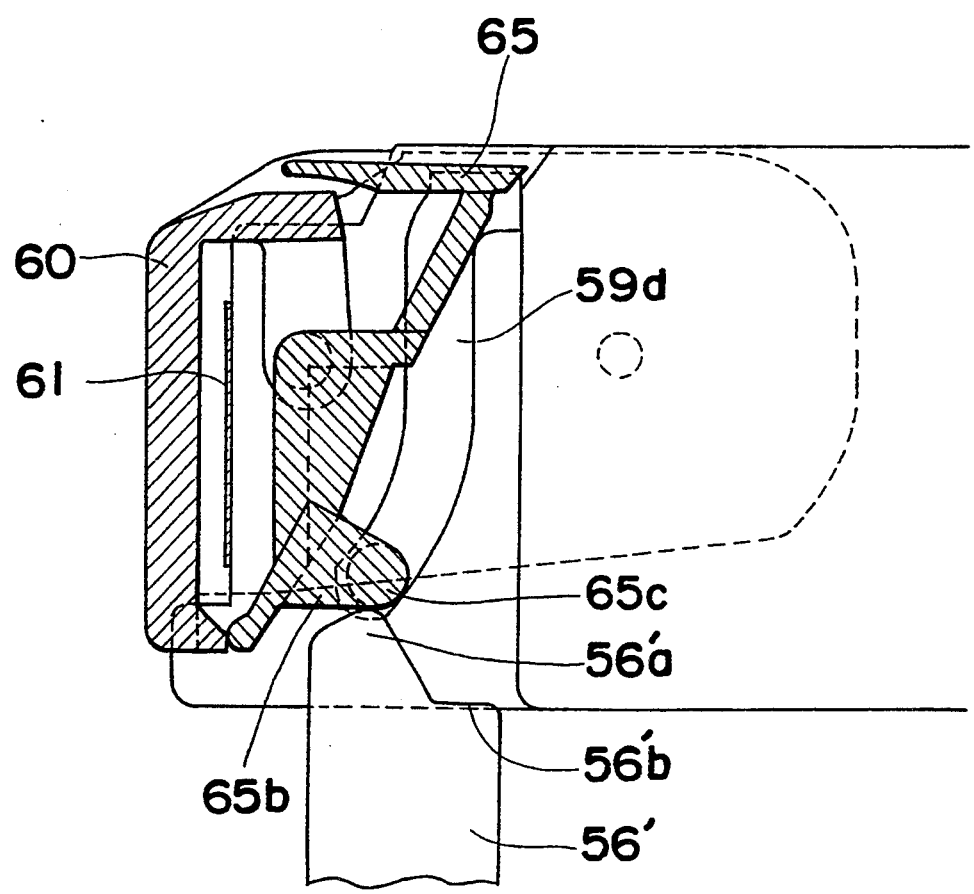
FIGS. 21, 22 and 23 are cross sectional views of a fundamental part of a lid portion of a tape cassette explanatory of a lid opening means of a cassette loading apparatus according to an embodiment Ib of the present invention.

FIG. 21 is a cross sectional view showing fundamentally the state when the lids are starting to be opened. A protruding part 56'a of a rear lid opener 56' is abutted by the part of the bracket part 65b from which guide pin 65c projects.

Thereafter, because of the vertical movement of the tape cassette 59 downwards, the rear lid 65 is thrust against the rear lid opener 56' and guided along the pair of guide grooves 59d. At the same time, the front lid 62 having the rear lid 65 rotatably connected therewith is turned in the opening direction against the force of the coil spring 64.

Figure 22:
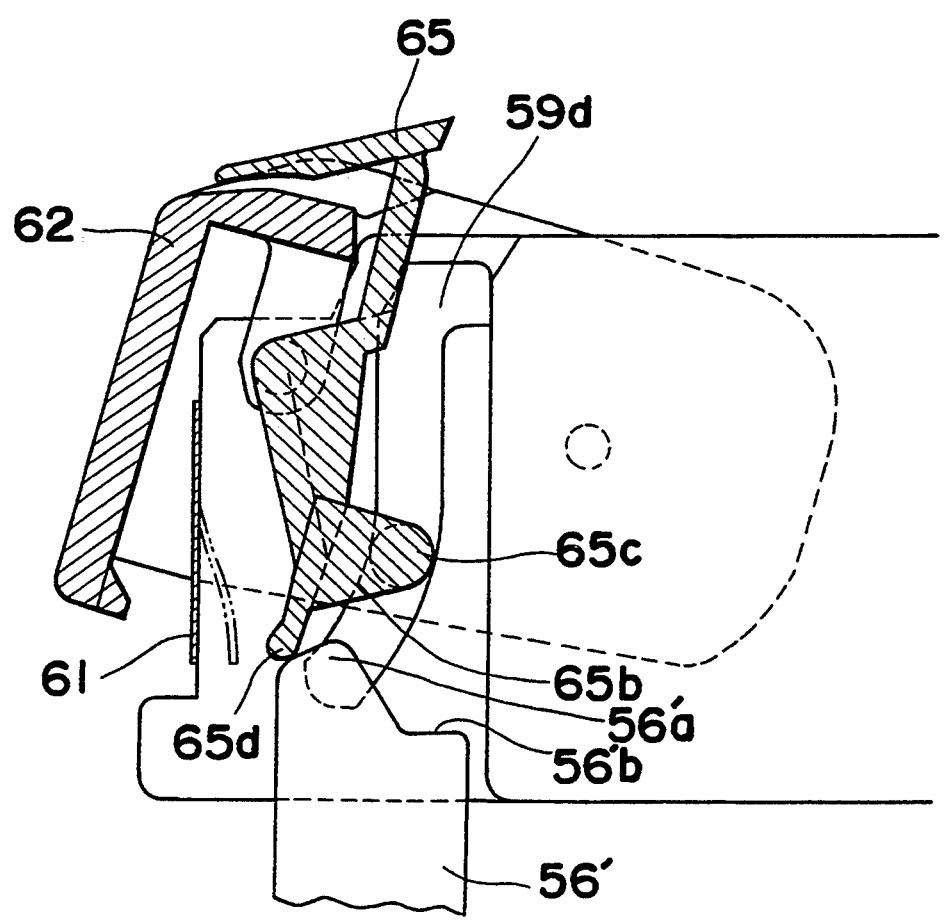

FIG. 22 is a cross sectional view showing fundamentally the state when the lids are being opened. The protruding part 56'a of the rear lid opener 56' is being contacted by a projecting portion 65d which protrudes downwards from the lower edge of the rear lid past bracket part 65b to close a gap between the lower edges of the front and rear lids, because the projection portion 65d and bracket part 65b of the rear lid 65 follow a curved locus away from the position of the tape 61 due to the configuration of the guide grooves 59d in the tape cassette 59 when the lids are being opened.

Figure 23:
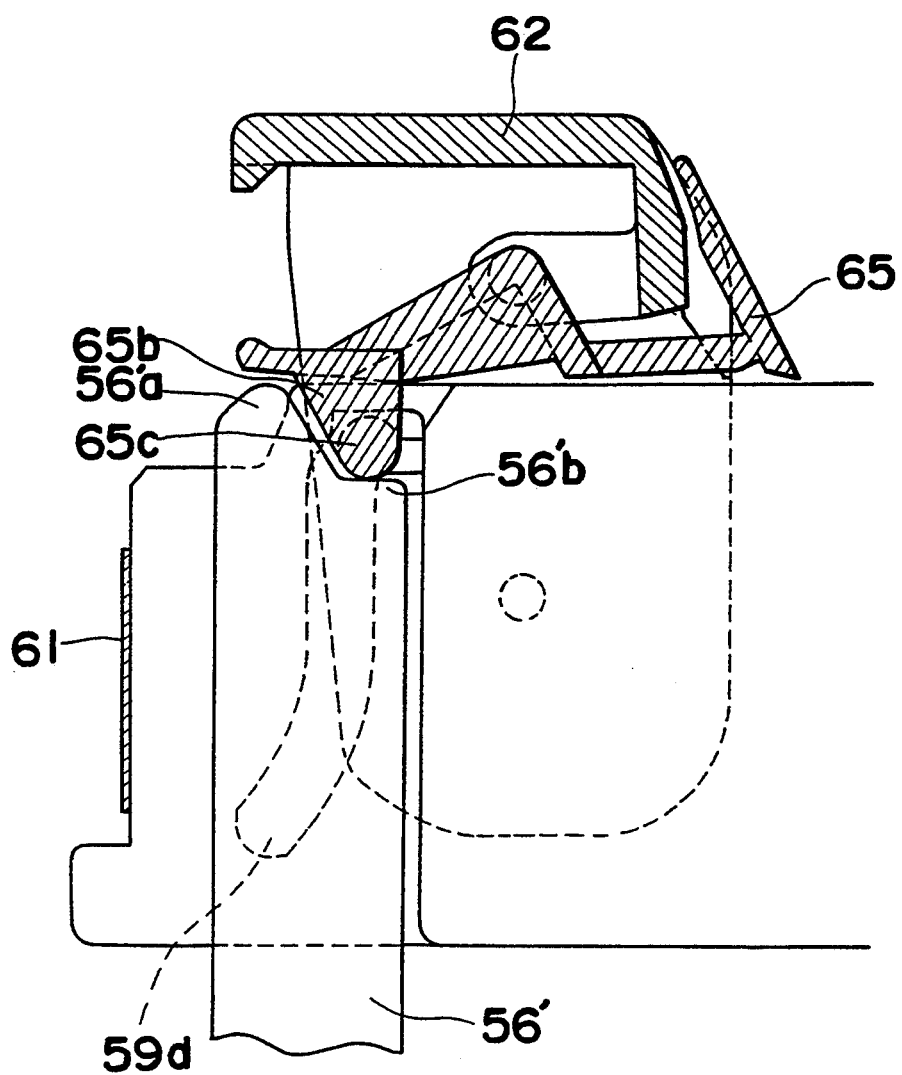

FIG. 23 is a cross sectional view fundamentally of the state when the lids are completely opened. A recess 56'b of the rear lid opener 56' the same as the recess 56 of embodiment Ia receives the bracket part 65b in the opened state of the lids.

As shown in FIGS. 19 and 20, each lower end projection portion 65d is formed at the lower end of rear lid 65 in the vicinity of the protrusion 65b of the rear lid 65.

FIG. 20 shows the side elevation of the rear lid 65, wherein the projecting portion 65d is indicated by shaded lines and protrudes downwards from the rear lid adjacent bracket part 65b.

The above-described embodiment Ib is substantially equivalent to the embodiment Ia, and therefore the same effect can be obtained. Moreover, such particular effect can also be exerted by the embodiment Ib as follows.

Figure 24:
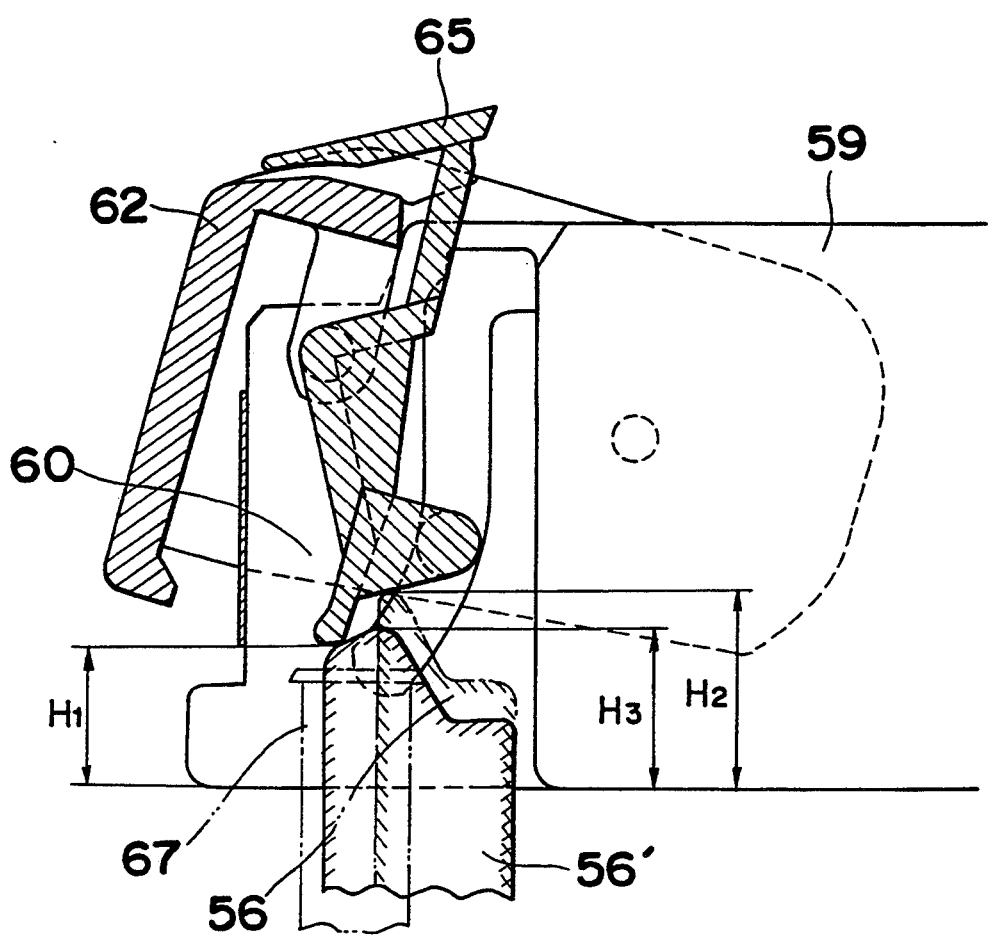
FIG. 24 is a cross sectional view of a fundamental part of the lid portion for comparison between the embodiments Ia and Ib.

Specifically, with reference to FIG. 24, although a verticle stroke H2 is necessitated in embodiment Ia to open the rear lid 65 to a predetermined height Hi by the rear lid opener 56, a shorter stroke H3 is enough in Embodiment Ib to open the rear lid to the same height H1 by the rear lid opener 56' (H3<H2).

Figure 25:
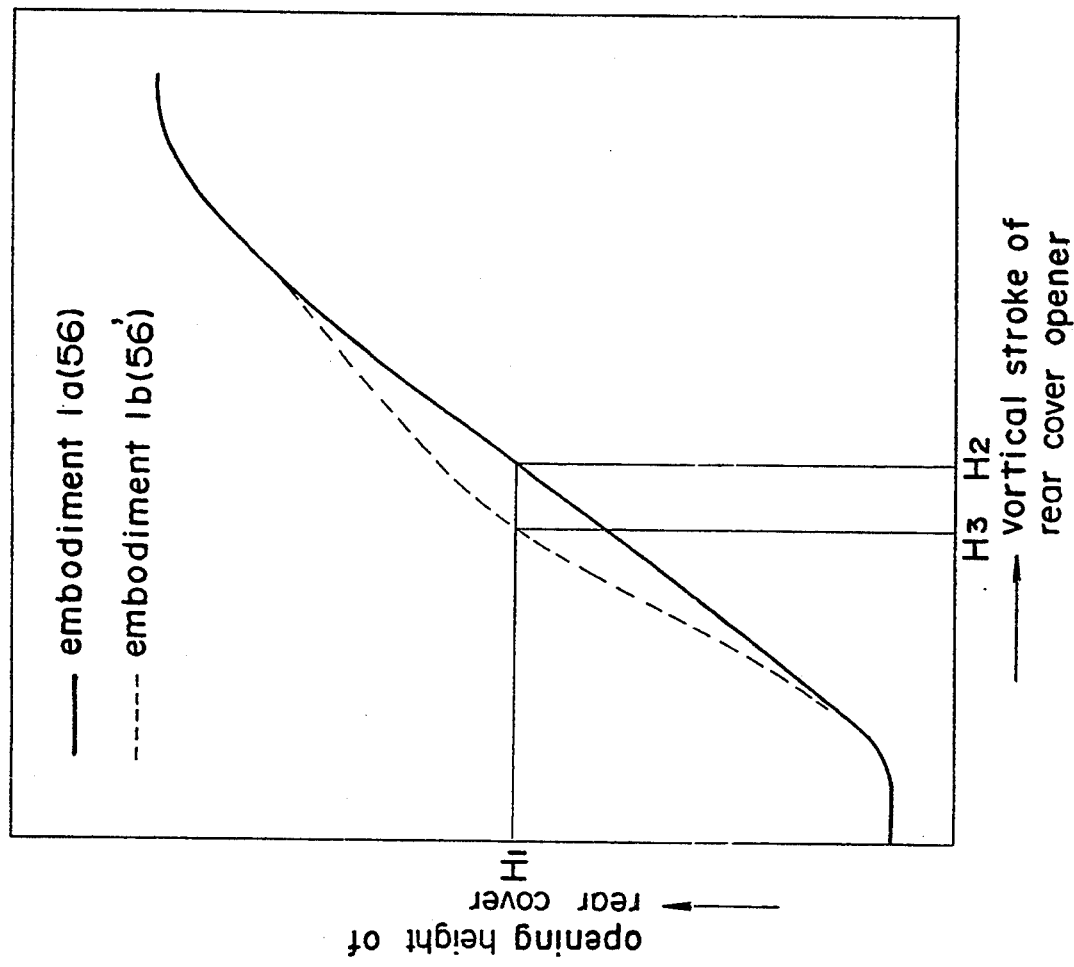
FIG. 25 is a graph for comparison between the embodiments Ia and Ib.

In this connection, FIG. 25 shows the relation between the vertical stroke (H2,H3) and opening height of the rear lid 65 (H1) when the rear lid openers 56,56' of the Embodiments Ia and Ib are used. A solid line indicates a curve obtained when the rear lid opener 56 of the Embodiment Ia is used, while a broken line is a curve of the rear lid opener 56' of the Embodiment Ib. As is clear from the graph, although the vertical stroke when the lids are completely opened is the same for both the rear lid openers 56,56', it is shorter when the rear lid opener 56' is used than the case of the rear lid opener 56 in the middle of the opening operation, with achieving a higher height.

As shown in FIG. 24, in general, when the tape cassette 59 is loaded in the cassette loading apparatus, a post 67 of the apparatus enters the opening port 60 at the front surface (surrounded by the front and rear lids 62,65) of the tape cassette 59. Therefore, if the post 67 is formed at a position below and adjacent to the opening port 60 of the tape cassette 59 inserted into the cassette holder 41, the post 67 is easy to enter the opening port 60 when the tape cassette 59 is moved in the vertical direction. Since a delay in opening the rear lid 65 would lead to a collision thereof with the post 67, the lid would be broken.

As such, when the rear lid 65 can be opened fast with the shorter stroke H3 as when the rear lid opener 56' is used, the foregoing problem is solved. (In the Embodiment Ia, it is necessary to form the post at a position separated from the lower surface of the tape cassette 59 since the vertical stroke for opening the rear lid 65 is long.)

Accordingly, since the lids 62,65 are arranged to be opened/closed by bringing the rear lid opener 56' to butt against the bracket part 65b and its vicinity (protrusion 65d) of the rear lid, not only the same effect is gained as by the Embodiment Ia, but the collision of the rear lid with the post can be prevented because of the quick opening of the rear lid 65.

It is to be noted here that although the rear lid opener is brought to butt against the bracket part 65b (and its vicinity) at one side of the rear lid 65 in the above Embodiments Ia and Ib, it may be possible to butt the rear lid opener to both bracket parts 65b (and their vicinity), with the same effect achieved. In addition, although the lids are opened by moving the cassette holder 41 as a cassette holding means in the above Embodiments Ia and Ib, the same effect can be achieved even by moving the rear lid opener 56 or 56' as a lid opening means in a direction towards the cassette.

Embodiment II

An Embodiment II will be described with reference to the drawings.

Figure 26:
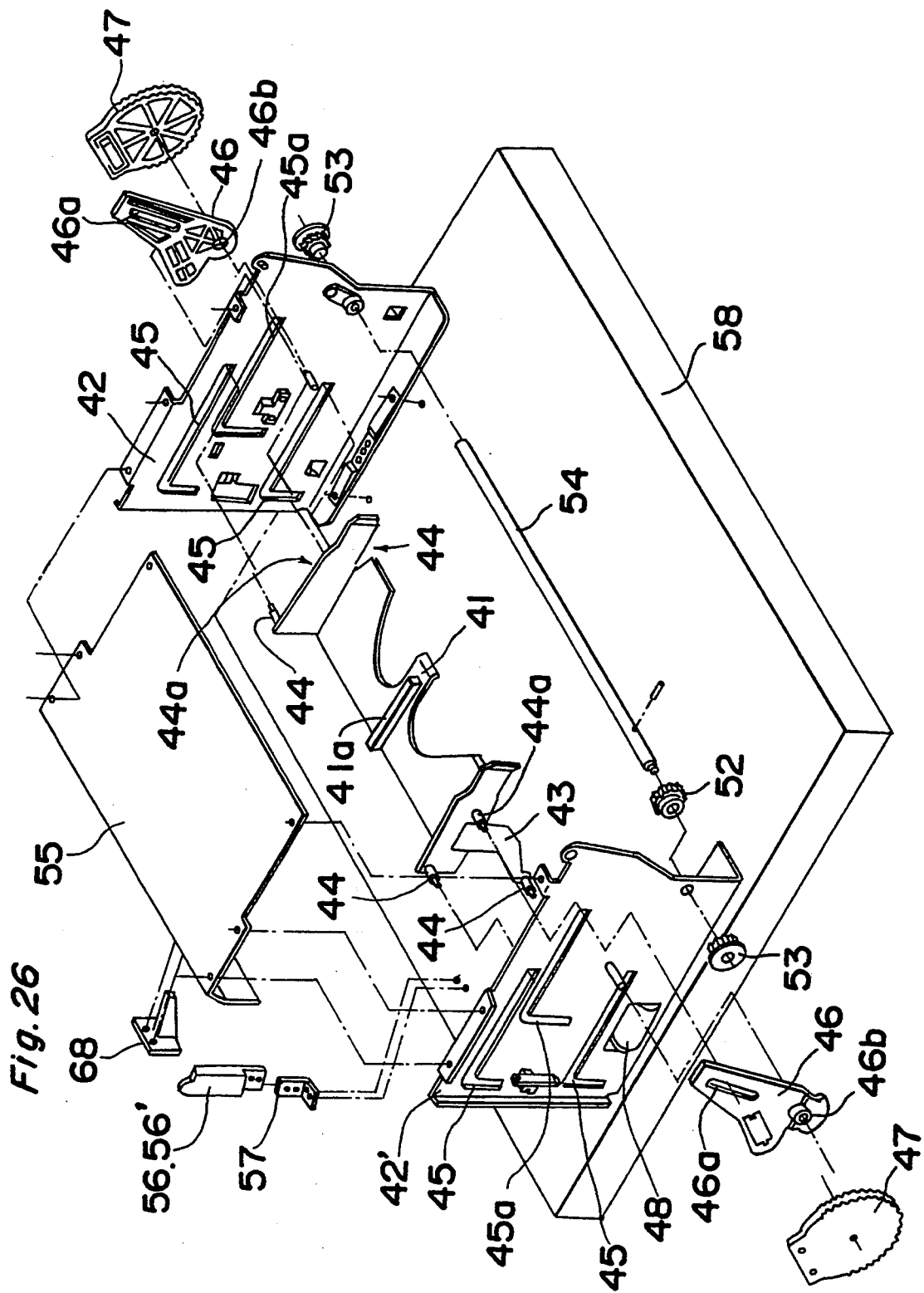
FIG. 26 is an exploded perspective view of a cassette loading apparatus according to an embodiment II of the present invention.
Figure 27:
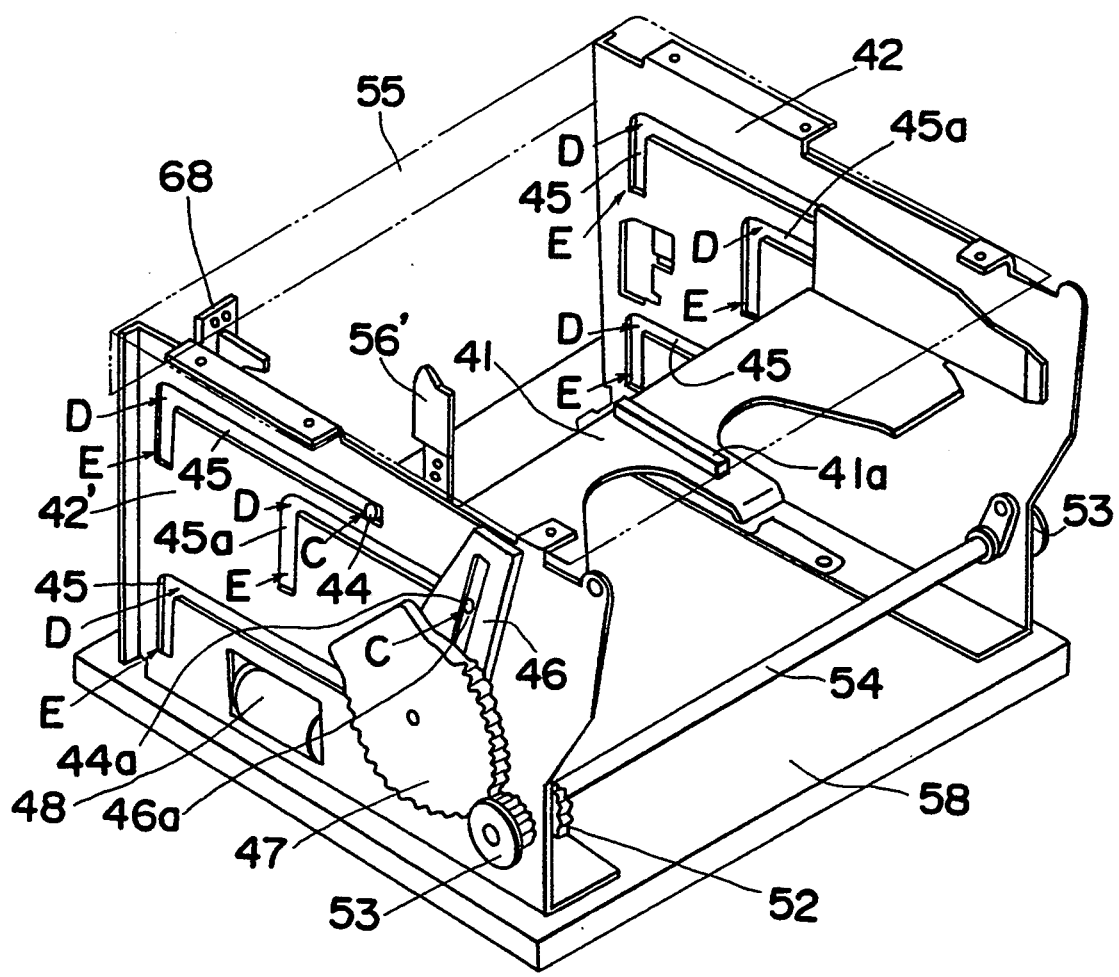
FIG. 27 is an assembled perspective view of the apparatus of FIG. 26.

FIGS. 26 and 27 show an exploded perspective view of a cassette loading apparatus and an assembled perspective view of the apparatus according to an embodiment II of the present invention. The cassette loading apparatus of this embodiment II is formed substantially in the same structure as the apparatus of the embodiment I shown in FIGS. 10 and 11, and therefore the same components are designated by the same reference numerals, detailed description thereof being abbreviated here.

Figure 28:
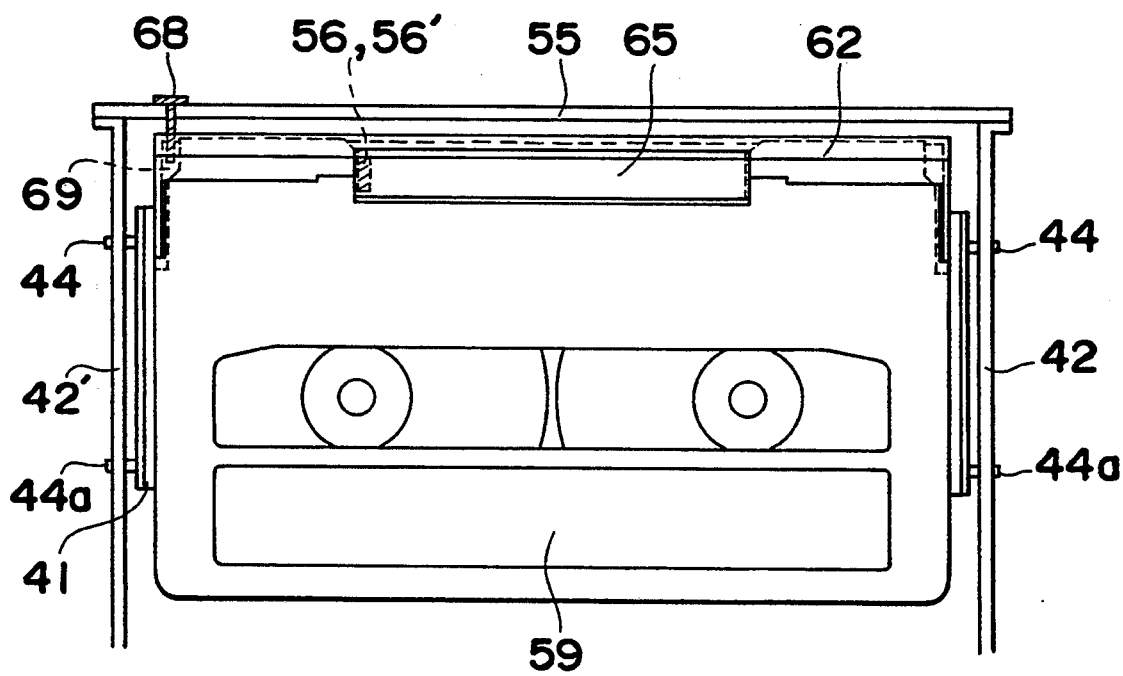
FIG. 28 is a plane view of a fundamental part when a tape cassette is inserted into the apparatus of FIG. 26.
Figure 29:
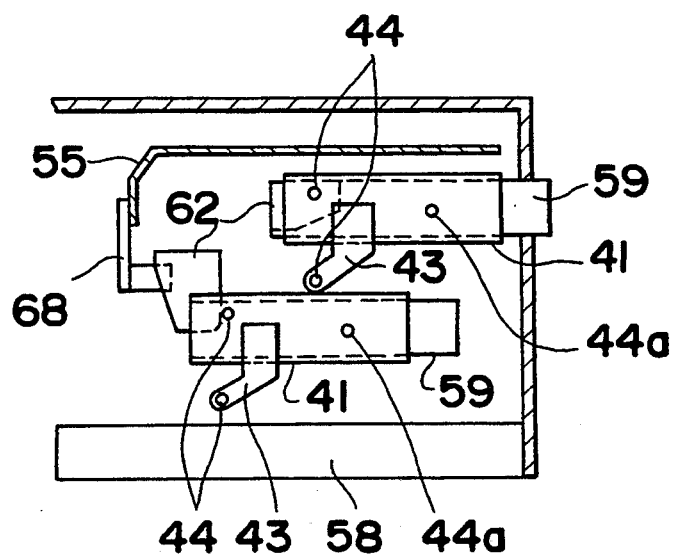
FIG. 29 is a cross sectional view of a fundamental part of a lid opening means of the apparatus of FIG. 26.

FIG. 28 is a plane view when the cassette holder 41 of FIG. 27 is moved in the horizontal direction to the position D, and FIG. 29 is a cross sectional view explanatory of the movement.

A front lid opener 68 is fixed to the top plate 55, the position of which coincides with a front lid opening portion 69 formed in the tape cassette 59.

The rear lid openers 56,56' are equivalent to those in the Embodiments Ia and Ib.

The cassette loading apparatus having the above-described construction will operate as follows.

Referring to FIGS. 28 and 29, when the tape cassette 59 is inserted into the apparatus, the front lid opener 68 is brought to butt against the front lid 62 during the vertical movement of the cassette holder 41, and at the same time, the rear lid openers 56,56' are turned into pressed contact with the rear lid 65 as shown in FIGS. 16–18 or 21–23. As a result of this interlocking movement, the front and rear lids are both turned in the opening direction against the coil spring 64. Since the front and rear lid openers 68 and 56,56' are brought to butt against the front and rear lids 62 and 65 against the coil spring 64 for opening the lids, respectively, these openers should be formed of rigid material having sufficient endurance to the opening load. The material of the front and rear lids 68 and 56,56' may be anything, e.g., metal or synthetic resin, etc. so long as it can bear the load.

Since the respective openers 68 and 56,56' are pressed in touch with the front and rear lids 62 and 65 thereby to opening the lids, it is possible to reduce the load applied to the rear lid openers 56,56' when the lids are opened, and accordingly the rear lid opener and rear lid can be prevented from being damaged.

Furthermore, if rear lids 73,74,75 are used in common and opening portions 77a,78a of the front lids 77,78 are formed at a common position as shown in FIGS. 30 and 31, the plurality of the tape cassettes 70,71,72 can be opened by the arrangement of the Embodiment II. The structure of the lids of the tape cassettes shown in FIGS. 30 and 31 is the same as explained with reference to FIGS. 13 and 14. The cassette guide grooves 70a,71a,72a are formed at a common position at the bottom surface of the tape cassettes 70,71,72, respectively. As shown in FIG. 31D indicating the state where the three cassettes 70,71,72 are held in the cassette holder 41', when the tape cassettes are inserted into the cassette holder, the guide grooves 70a,71a,72a are engaged with the cassette guide protruding part 41a' and guided to a predetermined position where the lids can be opened. As indicated by oblique lines, protrusions 73a,74a,75a of the rear lids of the tape cassettes 70,71,72 and front lid opening portions 77a,78a of the front lids 77,78 are retained at a common position.

The tape cassette 70 with the front lid 76 not so large in size can be opened in the same manner as in the Embodiment Ia or Ib, namely, by thrusting only the rear lid 73 to the opener, whereas the tape cassettes 71 and 72 having the large front lids 77,78 are opened by bringing both the front lids 77,78 and rear lids 74,75 to butt against the respective openers as described in the embodiment II.

According to the embodiment II, as described hereinabove, both the front and the rear lids 62 and 65 are brought to butt against the respective openers to open the cassette 59. Therefore, the conventional damage of the rear lid openers 56,56' and the rear lid 65 can be prevented.

Since the rear lid 65 is opened in the similar manner as in the embodiment Ia or Ib, the same effect as in the embodiment Ia or Ib can be also achieved.

In addition, even when such tape cassettes as shown in FIGS. 30 and 31 are inserted into the apparatus, all the lids of the tape cassettes 70,71,72 can be opened/closed.

Although the rear lid 65 is opened by thrusting the bracket parts 65b or, the bracket parts 65b and their vicinity according to the Embodiment II, the lower end face of the rear lid 65 may be thrusted as in the prior art, making it possible to prevent a damage of the rear lid opener and rear lid. The same effect as this can be obtained even by moving the front and rear lid openers 68 and 56,56' as a lid opening means in a direction towards the cassette although the lids are opened by moving the cassette holding means, namely, cassette holder 41 according to the above Embodiment II.

Embodiment III

A cassette loading apparatus according to an embodiment III of the present invention will be described with reference to the drawings.

Figure 32:
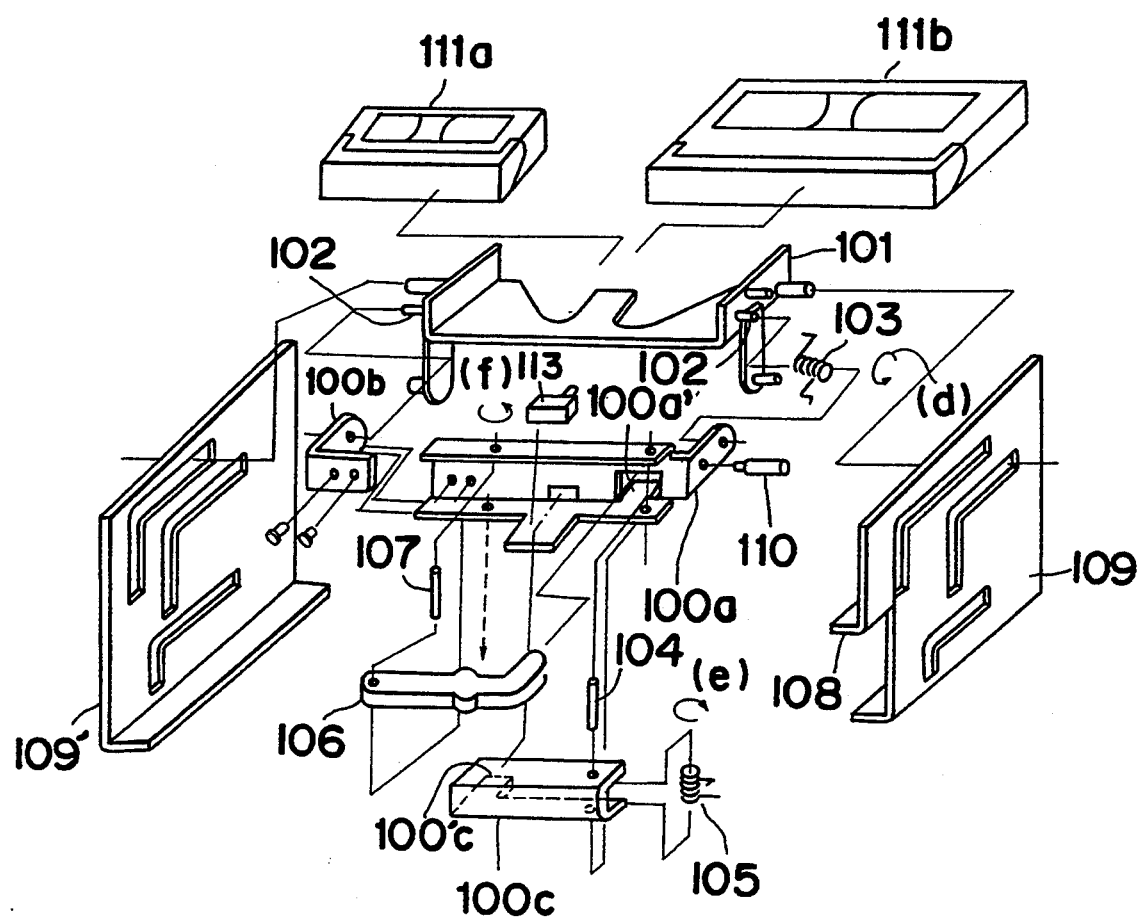
FIG. 32 is an exploded perspective view of a cassette loading apparatus according to an embodiment III of the present invention.
Figure 33:
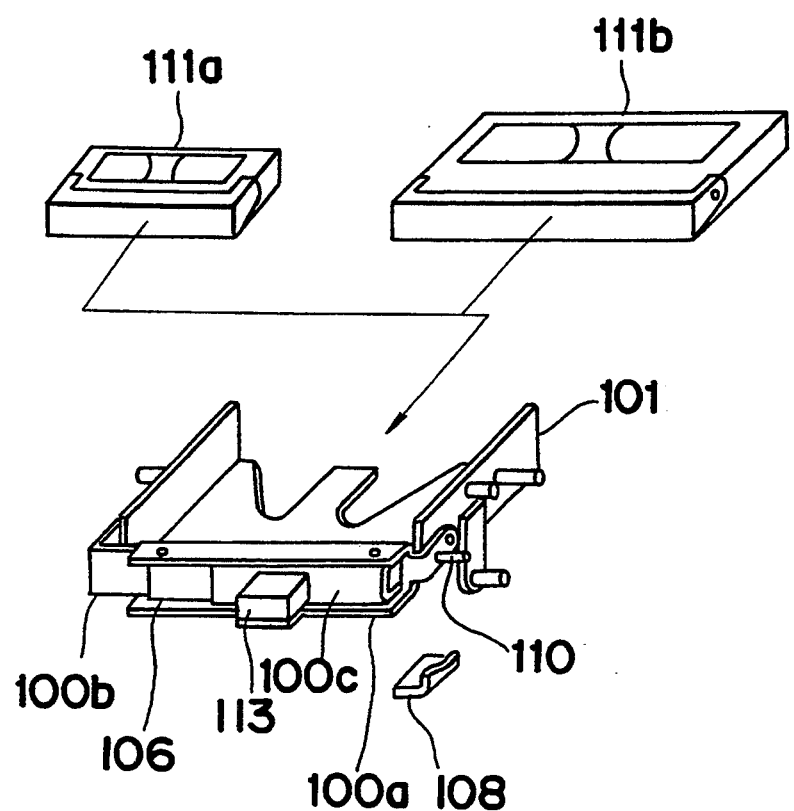
FIG. 33 is an assembled perspective view of the apparatus of FIG. 32.
Figure 38:
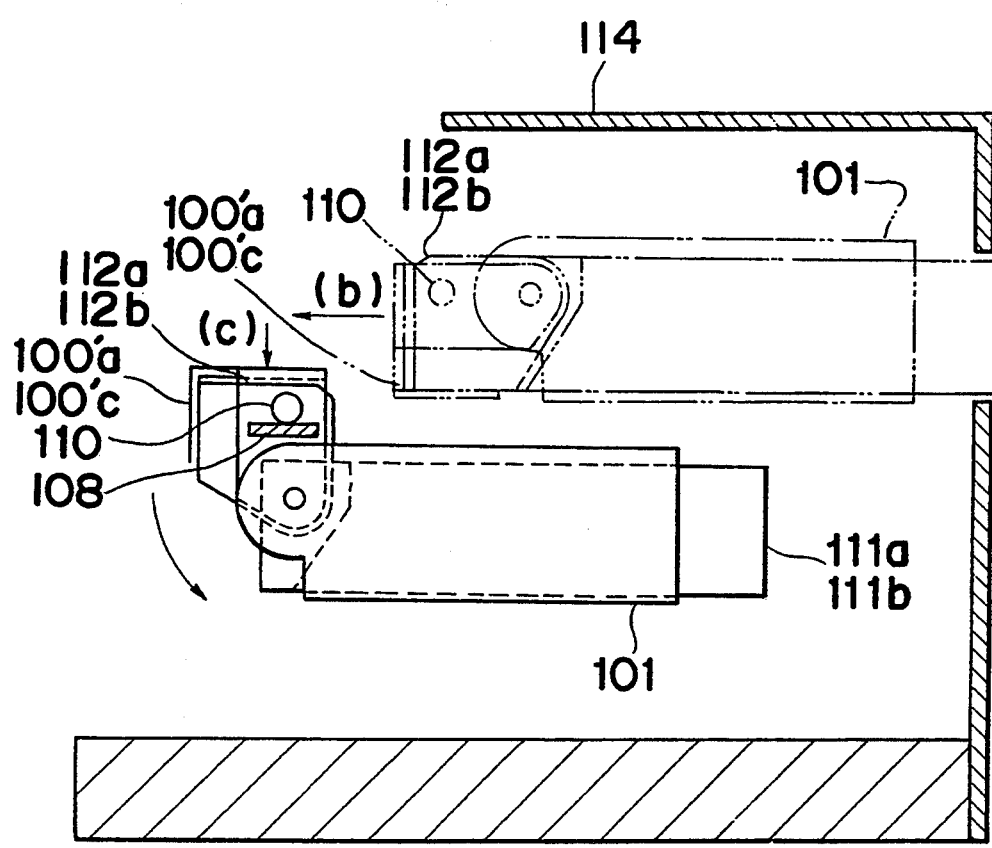
FIG. 38 is a side elevational view of a fundamental part of a lid opening means of the apparatus of FIG. 32.

FIGS. 32, 33 and 38 are an exploded perspective view of a cassette loading apparatus according to the embodiment III of the present invention, an assembled perspective view and a side elevational view thereof, respectively. Since a guiding means for guiding a cassette holder 101 to a predetermined position is in the same structure as that of the embodiment I, it will be omitted from the description below.

Referring to FIG. 32, a front lid opener 100a has an arm 100b which is supported by a pin 102 at the side of the cassette holder 101 in a rotatable manner along with the front lid opener 100a to the cassette holder 101. The arm 100b is urged in a direction (d) by a spring 103 around the pin 102. A front lid opener 100c for a small cassette is rotatably held at a main plate of the front lid opener 100a by a pin 104 and urged in a direction (e) by a spring 105 around the pin 104. A cassette detecting lever 106 is also rotatably supported to the main plate of the front lid opener 100a by a pin 107. The cassette detecting lever 106 is in pressed contact with the front lid opener 100a at a protruding part 106' and normally urged in a direction (f). A kick plate 108 of a side plate 109 is butted to a kick pin 110 in the front lid opener 100a when the cassette holder 101 is moved to a predetermined position.

The operation of the cassette loading apparatus in the above structure is as follows.

Figure 34:
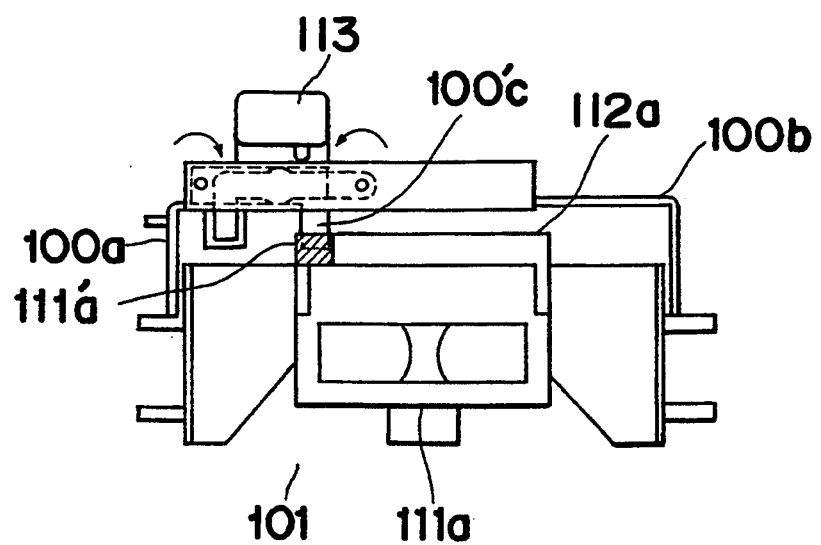
FIGS. 34 and 35 are a plane view of the whole of the apparatus when inserted with a small cassette and a plane view of a fundamental part thereof.
Figure 35:
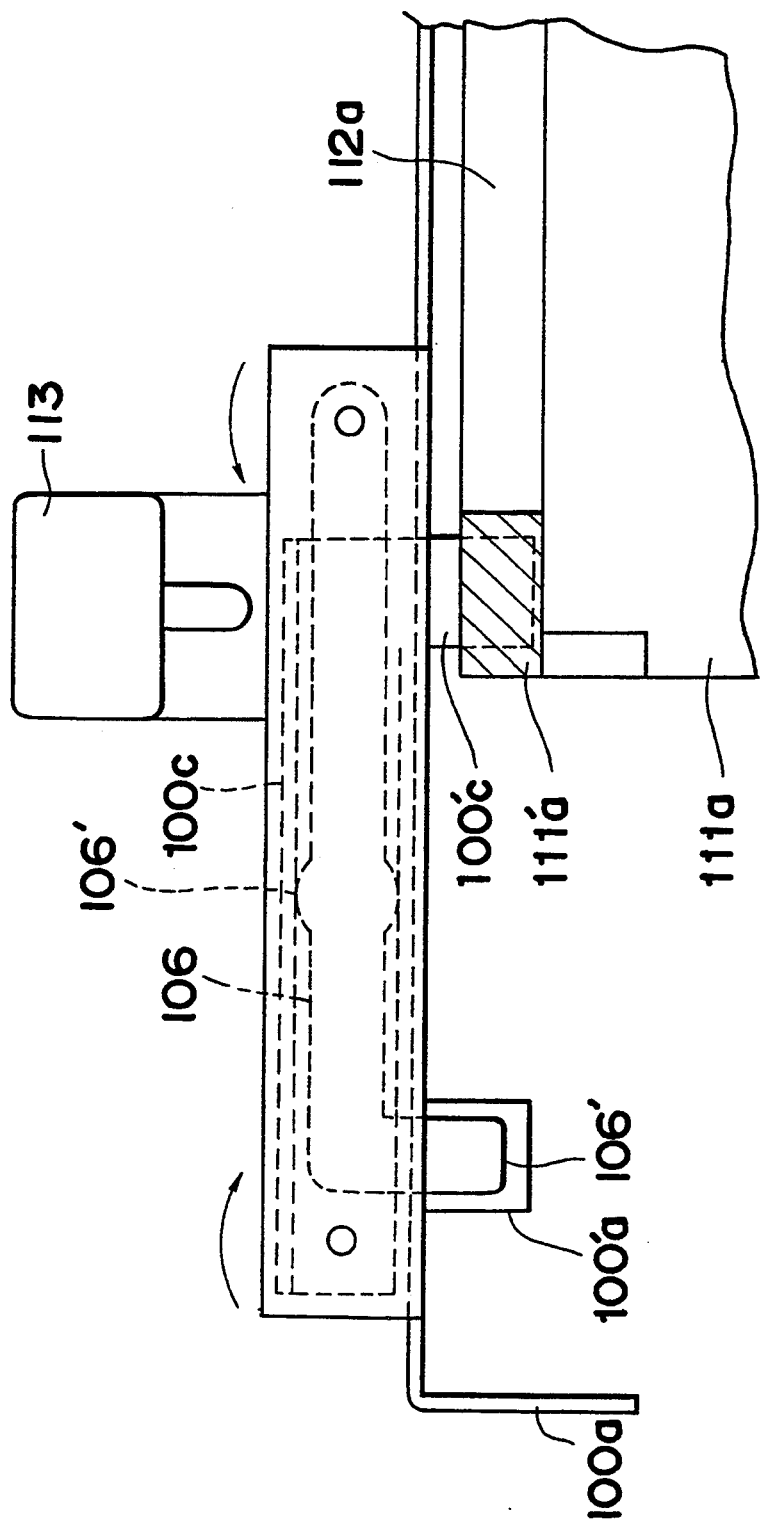

Referring to FIGS. 34 and 35, when a small cassette 111a among the cassettes of different size is inserted into the cassette holder 101, a small protrusion 100c' of the front lid opener 100c becomes engaged with a small opening portion 111a' of the small cassette 111a. As the cassette holder 101 is moved within an apparatus 114 in directions of arrows (b) and (c) of FIG. 38, the kick pin 110 formed in the front lid opener 100a is brought in pressed contact with the kick plate 108, thereby rotating the front lid opener 100a in a clockwise direction as shown in FIG. 38. Since the front lid opener 100a has the opener 100c, a lid 112a of the small cassette is eventually rotated by the clockwise rotation of the front lid opener 100c.

Figure 36:
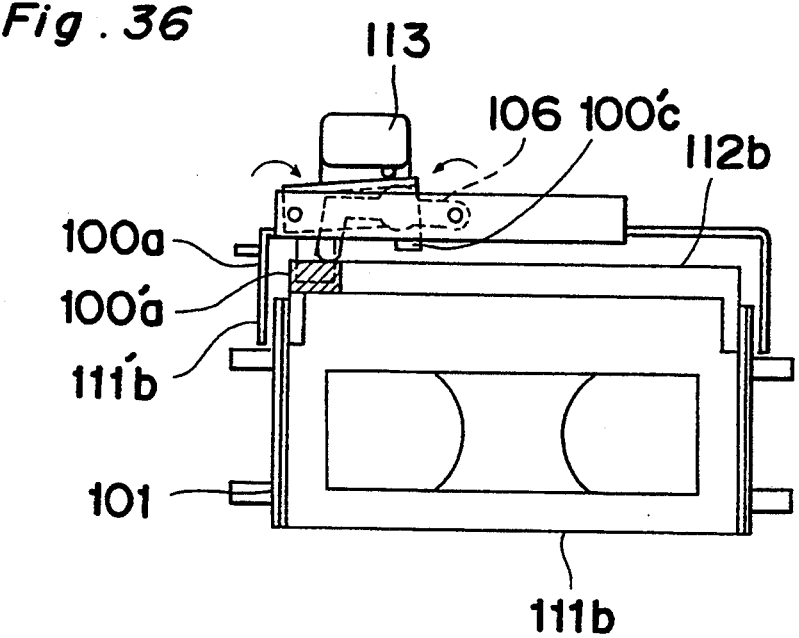
FIGS. 36 and 37 are a plane view of the whole of the apparatus when inserted with a large cassette and a plane view of a fundamental part thereof.
Figure 37:
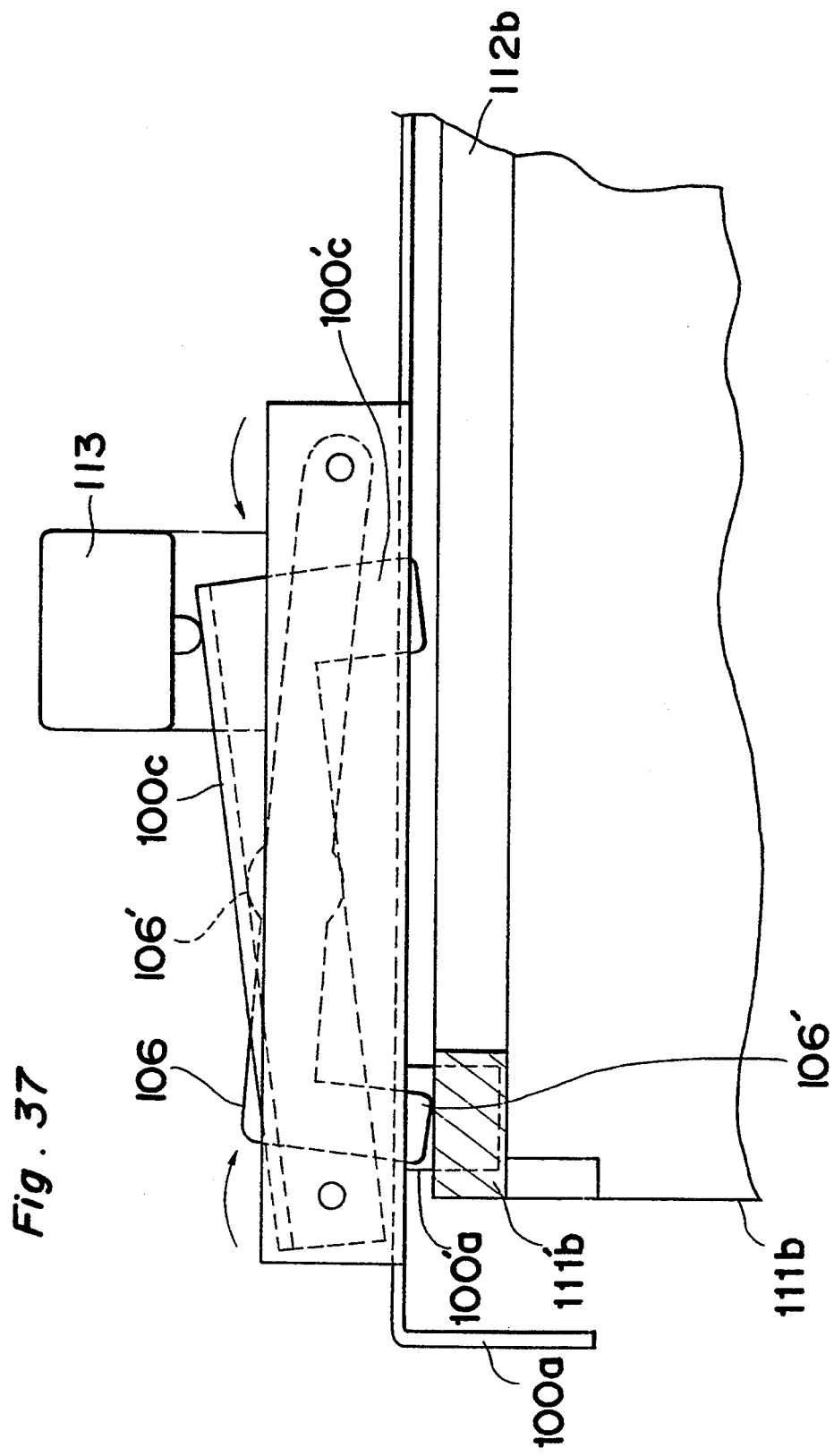

Next, with reference to FIGS. 36 and 37, when a large cassette 111b among the cassettes of different size is inserted into the cassette holder 101, the detecting lever 106 and the front lid opener 100c for a small cassette alike are turned respectively through contact with the protruding part 106', and the small protrusion 100c' is moved to a position where it is not engaged with the large cassette 111b. Instead, a large protrusion 100a' formed in the front lid opener 100a is engaged with a large opening portion 111b' of the large cassette 111b. Accordingly, as the cassette holder 101 is moved within the apparatus 114, a lid 112b of the large cassette is rotated in the same manner as when the small cassette 111a is inserted into the cassette holder 101.

As described hereinabove, it is so arranged in the embodiment III of the present invention that one of a plurality of the tape cassettes inserted in the apparatus is selected and the front lid is opened/closed by the respective front lid opener corresponding to the selected tape cassette. Therefore, it becomes possible to load a plurality of tape cassettes different in size from each other into the same apparatus.

Moreover, no such means as to push up the rear lid of the tape cassette is provided in the loading apparatus, whereby a tape damage, tape break or deformation of the rear lid encountered in the prior art can be prevented.

Besides, the following or the like restrictions to the constitution of the lid of the tape cassettes loaded in the apparatus of the Embodiment III can be removed;

1. It is not necessary to form a rear lid for each tape cassette, nor is necessary to make common the rear lids of the tape cassettes; and 2. It is not necessary to make the position of the front lid opening portion of each tape cassette common.

Therefore, the loading apparatus of the present embodiment is greatly advantageous in that a plurality of tape cassettes having different structure of the lid can be loaded in the apparatus.

Furthermore, as shown in FIGS. 34-37, a microswitch 113 is provided in the vicinity of the front lid opener 100c of a small cassette, which is turned on or off in accordance with the presence or absence of the rotation of the front lid opener 100c. Although it is so arranged that the front lid opener 100c of a small cassette and the detecting lever 106 are turned around the pins 104,107, they may slide on the front lid opener 100a. It becomes possible to dispense with the detecting lever if a protrusion is formed in the front lid opener of a small cassette at such a position as to be not in touch with the lid of the cassette when a small cassette is inserted in the cassette holder, while being in touch with the lid of the cassette when a large cassette is inserted into the cassette holder.

The constant of the operating circuit, operation display circuit or recording/reproducing circuit (not shown) of the apparatus can be changed by turning-on or -off of the microswitch 113.

Although the microswitch 113 is provided in the vicinity of the front lid opener 100c for a small cassette in the foregoing description, the microswitch 113 may be provided in the vicinity of the cassette detecting lever 106, so that the microswitch 113 is turned on or off by the presence or absence of the rotation of the lever 106.

Even if the moving means for the cassette holder in any of the aforementioned embodiments I-III is of a cassette-up system which will be described below, the same effect can be achieved.

The moving means of a cassette-up system will be explained.

FIG. 39 shows a perspective view of a moving means of a cassette-up system of a preferred embodiment.

A cassette holder 82 has a top plate 83 securely mounted thereon to accommodate a cassette 81. A main shaft 91 is rotatably supported by the cassette holder 82 and top plate 83, with link arms 85 fixed to the opposite ends thereof. A guide pin 85a is provided in the other end of each link arm 85 and engaged with a guide groove 86a of a side plate 86. Moreover, an arm pin 86b is provided in the side plate 86. A link arm 84 is rotatable around this arm pin 86b and urged in a direction (a) by a link arm spring 93. A guide pin 84a at the other end of the link arm 84 is engaged with a guide groove 82a formed in the cassette holder 82 and top plate 83. A link pin 90 stands at the central part of the link arm 84. When the link pin 90 is engaged with the link arm 85, the link arm 84 is rotated. A rear lid opener 87 is secured to a chassis 92 via the side plate 86, a front lid opener 89 and a mounting plate 88.

The moving means of a cassette-up system in the above-described structure will operate in the manner as described below. Upon depression of the cassette holder 82, guide pins 84a and 85a are moved along the guide grooves 82a and 86a, with the link arm 84 being turned around the arm pin 86b and link arm 85 being rotated along with the main shaft 91, thereby lowering the cassette 81 within the cassette holder 82 while the cassette 81 is kept in the horizontal state.

The lid opening means of the tape cassette 81 is equivalent to that of the foregoing embodiments, and therefore the detailed description will be abbreviated.

Accordingly, the present invention can accomplish the following excellent effects:

1. A tape damage and a tape break which would be caused when the front and rear lids of a tape cassette are opened/closed can be prevented;

2. The variation in the opening height of the rear lid when the tape cassette is opened and a gap between the front and rear lids when they are closed can be removed, so that an increase of drop-outs can be prevented;

3. A damage of a rear lid opener and the rear lid when the tape cassette is opened/closed can be prevented; and 4. A plurality of the tape cassettes can be loaded in the same apparatus, with fulfilling the above-described advantages.

It is further understood by those skilled in the art that the foregoing description is made as to preferred embodiments of the disclosed invention and that various changes and modifications may be made according to the invention without departing from the spirit and scope thereof.

What is claimed is:

1. A cassette loading apparatus comprising:
   a cassette holding means;
   means for moving said cassette holding means between a cassette loading position and a cassette playing position;
   a cassette mountable in said cassette holding means and having a front lid and a rear lid each mounted on said cassette for movement between a closed and an open position and interlocking with each other, said rear lid having a projecting portion on an end thereof which is toward the closed position for extending past the edge of a tape when the rear lid is in the closed position; and
   a front lid opening means engagable with said front lid of said cassette, and a rear lid opening means simultaneously engagable with said rear lid of said cassette during relative movement of said cassette holding means and said front and rear lid opening means in a cassette loading direction for simultaneously opening said front lid and said rear lid interlocked therewith, said rear lid opening means being engagable with said rear lid at a portion on the other side of said projecting portion from the tape.

2. A cassette loading apparatus as claimed in claim 1, wherein said front lid opening means and said rear lid opening means are a front lid opening member and a rear lid opening member which are abutted against said front lid and said rear lid of the cassette, respectively, during said relative movement to open said front and rear lids, respectively.

3. A cassette loading apparatus as claimed in claim 2, wherein said cassette includes an urging means urging said front and rear lids in a closing direction, and said front and rear lid opening members are rigid bodies capable of exerting a force on said front and rear lids for opening said front and rear lids against said urging means, respectively.

4. A cassette loading apparatus as claimed in claim 3, wherein said rear lid opening member abuts against a lower end face of said rear lid to open said rear lid.

5. A cassette loading apparatus as claimed in claim 2 wherein said rear lid has side face means at opposite ends thereof, said rear lid opening member abutting with at least one of said side face means to open said rear lid.

6. A cassette loading apparatus and a small tape cassette and a large tape cassette loadable by said cassette loading apparatus into a cassette playing position in a tape player;
   said small cassette including a pair of reels spaced at a first distance, a cassette body accommodating the pair of reels and provided with a guiding means at the center between the reels, and front and rear lids connected with each other for covering a tape extending between the pair of reels at the front of the cassette body;
   said large tape cassette including a pair of reels spaced at a second distance which is larger than said first distance, a cassette body accommodating the pair of reels and provided with a guiding means at the center between the reels, and front and rear lids connected with each other for covering a tape extending between the pair of reels at the front of the cassette body;
   the rear lid of each of the small tape cassette and the large tape cassette having two projections thereon at points spaced along the length thereof, the points and spacing of said projections being the same on each tape cassette;
   a cassette holding means in said cassette loading apparatus for holding either the small tape cassette or the large tape cassette and having cassette engaging-complementary guiding means for engaging the guiding means of either of the tape cassettes to guide either of the tape cassettes onto said cassette holding means;
   a moving means in said cassette holding apparatus for moving said cassette holding means between a cassette loading position and a cassette playing position;
   a lid opening means in said cassette loading apparatus for opening the front and rear lids of either the small tape cassette or the large tape cassette and positioned for engaging at least one of the projections provided on the rear lid of each of the small tape cassette and the large tape cassette when said cassette holding means moves from the cassette loading position to the cassette playing position; and
   a further lid opening means in said cassette loading apparatus and positioned for engaging the front lid of only said large tape cassette when said cassette holding means moves from the cassette loading position to the cassette playing position for applying a force for opening the front lid of the large tape cassette simultaneously with a force applied to the front lid of said large cassette by said firstmentioned lid opening means through the rear lid of said large tape cassette connected to the front lid of said large tape cassette.

7. A cassette loading apparatus as claimed in claim 6 in which said engaging/guiding means is a guiding protrusion on said cassette holding means, and said complementary guiding means is a guiding groove in a bottom face of said cassette, whereby cassettes of different sizes each with a guiding groove can be properly positioned on said cassette holding means.

* * * * *